(12) United States Patent
Oberhauser et al.

(10) Patent No.: US 11,212,296 B2
(45) Date of Patent: Dec. 28, 2021

(54) SYSTEMS AND METHODS FOR MANAGING DIGITAL IDENTITIES

(71) Applicant: Cambridge Blockchain, Inc., Cambridge, MA (US)

(72) Inventors: Alex Oberhauser, Medford, MA (US); Matthew Commons, Cambridge, MA (US)

(73) Assignee: Cambridge Blockchain, Inc., Cambridge, MA (US)

( * ) Notice: Subject to any disclaimer, the term of this patent is extended or adjusted under 35 U.S.C. 154(b) by 128 days.

(21) Appl. No.: 16/296,995

(22) Filed: Mar. 8, 2019

(65) Prior Publication Data

US 2019/0207951 A1   Jul. 4, 2019

Related U.S. Application Data

(63) Continuation of application No. 15/950,732, filed on Apr. 11, 2018, now Pat. No. 10,938,835, which is a
(Continued)

(51) Int. Cl.
*H04L 29/06* (2006.01)
*G06F 21/33* (2013.01)
(Continued)

(52) U.S. Cl.
CPC ............ *H04L 63/126* (2013.01); *G06F 21/33* (2013.01); *G06Q 10/06* (2013.01);
(Continued)

(58) Field of Classification Search
CPC ..... H04L 63/126; H04L 9/3247; H04L 63/08; H04L 2209/38; H04L 2209/56;
(Continued)

(56) References Cited

U.S. PATENT DOCUMENTS

| | | | |
|---|---|---|---|
| 6,367,013 | B1 | 4/2002 | Bisbee et al. |
| 6,553,494 | B1 | 4/2003 | Glass |

(Continued)

FOREIGN PATENT DOCUMENTS

| | | | |
|---|---|---|---|
| CN | 1308803 | A | 8/2001 |
| CN | 101425903 | A | 5/2009 |

(Continued)

OTHER PUBLICATIONS

U.S. Appl. No. 15/950,732, filed Apr. 11, 2018, Oberhauser et al.
(Continued)

*Primary Examiner* — Catherine Thiaw
(74) *Attorney, Agent, or Firm* — Wolf, Greenfield & Sacks, P.C.

(57) ABSTRACT

Systems and methods for managing digital identities. In some embodiments, a method is provided, comprising acts of: receiving a request to validate at least one statement about a user; identifying, from the request, a reference to a distributed ledger, the reference comprising an identifier for the distributed ledger and an identifier for a transaction recorded on the distributed ledger; identifying, based at least in part on the identifier for the distributed ledger, at least one node of a network of nodes managing the distributed ledger; and communicating with the at least one node to validate the at least one statement about the user.

21 Claims, 11 Drawing Sheets

Related U.S. Application Data continuation-in-part of application No. PCT/US2016/057232, filed on Oct. 14, 2016.

(60) Provisional application No. 62/380,467, filed on Aug. 28, 2016, provisional application No. 62/325,880, filed on Apr. 21, 2016, provisional application No. 62/264,418, filed on Dec. 8, 2015, provisional application No. 62/241,436, filed on Oct. 14, 2015.

(51) Int. Cl.
| | | |
|---|---|---|
| *G06Q 10/06* | | (2012.01) |
| *G11B 20/00* | | (2006.01) |
| *H04L 9/32* | | (2006.01) |

(52) U.S. Cl.
CPC ...... *G11B 20/00086* (2013.01); *H04L 9/3236* (2013.01); *H04L 9/3247* (2013.01); *H04L 63/08* (2013.01); *H04L 2209/38* (2013.01); *H04L 2209/56* (2013.01); *H04N 2201/3233* (2013.01)

(58) Field of Classification Search
CPC ... G06F 21/33; G06Q 10/16; G11B 20/00086; H04N 2201/3233
See application file for complete search history.

(56) References Cited

U.S. PATENT DOCUMENTS

| | | | |
|---|---|---|---|
| 6,985,608 | B2 | 1/2006 | Hoffman et al. |
| 8,838,503 | B2* | 9/2014 | Pelegero ............... G06Q 20/12 705/75 |
| 9,094,388 | B2 | 7/2015 | Tkachev |
| 9,749,140 | B2 | 8/2017 | Oberhauser et al. |
| 10,423,961 | B1* | 9/2019 | El Defrawy ........... G06Q 20/08 |
| 10,817,967 | B2 | 10/2020 | Chabanne et al. |
| 2001/0002485 | A1 | 5/2001 | Bisbee et al. |
| 2003/0037233 | A1 | 2/2003 | Pearson |
| 2003/0149781 | A1 | 8/2003 | Yared et al. |
| 2004/0003251 | A1 | 1/2004 | Narin et al. |
| 2004/0059924 | A1 | 3/2004 | Soto et al. |
| 2004/0111375 | A1 | 6/2004 | Johnson |
| 2004/0162786 | A1 | 8/2004 | Cross et al. |
| 2006/0029261 | A1 | 2/2006 | Hoffman et al. |
| 2006/0230437 | A1 | 10/2006 | Alexander et al. |
| 2006/0242405 | A1 | 10/2006 | Gupta et al. |
| 2008/0255990 | A1 | 10/2008 | Moore et al. |
| 2009/0307118 | A1 | 12/2009 | Baumgartner, IV |
| 2009/0313129 | A1 | 12/2009 | Rothschild |
| 2010/0115266 | A1 | 5/2010 | Guo et al. |
| 2011/0067095 | A1 | 3/2011 | Leicher et al. |
| 2011/0131661 | A1 | 6/2011 | Valls Fontanals et al. |
| 2012/0011029 | A1 | 1/2012 | Thomas |
| 2012/0197901 | A1 | 8/2012 | Wilson |
| 2013/0197946 | A1 | 8/2013 | Hurry |
| 2014/0032913 | A1 | 1/2014 | Tenenboym et al. |
| 2014/0074724 | A1* | 3/2014 | Gordon ............... G06Q 20/023 705/71 |
| 2014/0359281 | A1 | 12/2014 | Saboori et al. |
| 2015/0059003 | A1* | 2/2015 | Bouse ................... H04L 63/102 726/28 |
| 2015/0095352 | A1 | 4/2015 | Lacey |
| 2015/0244690 | A1 | 8/2015 | Mossbarger |
| 2015/0302400 | A1 | 10/2015 | Metral |
| 2015/0310424 | A1 | 10/2015 | Myers |
| 2015/0312041 | A1 | 10/2015 | Choi |
| 2015/0332283 | A1 | 11/2015 | Witchey |
| 2016/0142211 | A1 | 5/2016 | Metke et al. |
| 2016/0234026 | A1 | 8/2016 | Wilkins et al. |
| 2016/0260095 | A1 | 9/2016 | Ford |
| 2016/0260169 | A1* | 9/2016 | Arnold ................... G06Q 40/12 |
| 2016/0260171 | A1 | 9/2016 | Ford et al. |
| 2016/0261690 | A1* | 9/2016 | Ford ................... H04L 41/0806 |
| 2016/0283920 | A1 | 9/2016 | Fisher et al. |
| 2016/0284033 | A1 | 9/2016 | Winand et al. |
| 2016/0292680 | A1 | 10/2016 | Wilson et al. |
| 2016/0330027 | A1 | 11/2016 | Ebrahimi |
| 2016/0330035 | A1 | 11/2016 | Ebrahimi et al. |
| 2016/0342994 | A1* | 11/2016 | Davis ................. G06Q 20/4014 |
| 2016/0350749 | A1 | 12/2016 | Wilkins et al. |
| 2017/0011460 | A1 | 1/2017 | Molinari et al. |
| 2017/0039330 | A1 | 2/2017 | Tanner, Jr. et al. |
| 2017/0091397 | A1 | 3/2017 | Shah |
| 2017/0103391 | A1 | 4/2017 | Wilson, Jr. et al. |
| 2017/0109715 | A1 | 4/2017 | Aguirre et al. |
| 2017/0111175 | A1 | 4/2017 | Oberhauser et al. |
| 2017/0140408 | A1* | 5/2017 | Wuehler ............ G06Q 30/0207 |
| 2017/0177855 | A1 | 6/2017 | Costa Faidella et al. |
| 2017/0222814 | A1 | 8/2017 | Oberhauser et al. |
| 2018/0101684 | A1 | 4/2018 | Murphy et al. |
| 2018/0234433 | A1 | 8/2018 | Oberhauser et al. |

FOREIGN PATENT DOCUMENTS

| | | |
|---|---|---|
| CN | 101546407 A | 9/2009 |
| CN | 103312675 A | 9/2013 |
| JP | 2003-348077 A | 12/2003 |
| JP | 2004-213461 A | 7/2004 |
| JP | 2005-252621 A | 9/2005 |
| JP | 2006-165881 A | 6/2006 |
| JP | 2013-137588 A | 7/2013 |
| WO | WO 2015/085393 A1 | 6/2015 |
| WO | WO 2017/044554 A1 | 3/2017 |
| WO | WO 2017/066002 A1 | 4/2017 |
| WO | WO 2017/079795 A1 | 5/2017 |

OTHER PUBLICATIONS

PCT/US2016/057232, Jan. 19, 2017, International Search Report and Written Opinion.
International Search Report and Written Opinion for International Application No. PCT/US2016/057232 dated Jan. 19, 2017.
[No Author Listed], DIF Identity Hubs. 10 pages, https://github.com/decentralized-identity/identity-hub/blob/master/explainer.md [last retrieved Dec. 21, 2018].
[No Author Listed], Identity Blockchain Proof of Concept. Jun. 3, 2016. 3 pages. https://sbo.tech/blog/tech-blog-1/post/identity-blockchain-proof-of-concept-3 [last retrieved Oct. 23, 2018].
[No Author Listed], Identity.com Verifiable Credential Library. 12 pages. https://github.com/identity-com/credential-commons/blob/master/README.md [last retrieved Dec. 21, 2018].
[No Author Listed], One Small Step for the Web . . . Oct. 23, 2018. 21 pages. https://www.inrupt.com/blog/one-small-step-for-the-web [last retrieved Oct. 25, 2018].
[No Author Listed], Sidetree Protocol Specification. 13 pages. https://github.com/decentralized-identity/sidetree-core/blob/master/docs/protocol.md [last retrieved Dec. 21, 2018].
[No Author Listed], Universal Resolver—Architecture and Drivers. 2 pages. https://github.com/decentralized-identity/universal-resolver/blob/master/docs/architecture-drivers.md [last retrieved Dec. 21, 2018].
Amit, 12 Companies Leveraging Blockchain for Identification and Authentication. LTP: Let's Talk Payments. Mar. 28, 2016. 2 pages, [last accessed Jan. 30, 2017].
Andrieu et al., Verifiable Claims Use Cases. W3C Working Group Note. Jun. 8, 2017. 17 pages. https://www.w3.org/TR/verifiable-claims-use-cases [last retrieved Dec. 21, 2018].
Batlin, Crypto 2.0 Musings—Digital Identity on Blockchain, Sep. 12, 2015. 42 pages.
Berners-Lee et al., Semantic Web Tutorial Using N3. May 20, 2003. 35 pages.
Biggs, Your Next Passport Could Be On The Blockchain. TechCrunch. Oct. 13, 2014. 3 pages, [last accessed Jan. 30, 2017].
Birch, Identity is the New Money. 2014. 66 pages.
Brown, Identity and the blockchain: key questions we need to solve, 2014. 14 pages.

(56) References Cited

OTHER PUBLICATIONS

Buterin, Ethereum: Platform Review; Opportunities and Challenges for Private and Consortium Blockchains, Jun. 2, 2016. 45 pages.
Clippinger et al., From Bitcoin to Burning Man and Beyond, 2014. 226 pages.
De Montjoye et al., openPSD: Protecting the Privacy of Metadata through SafeAnswers, Jul. 9, 2014. 9 pages.
Demos et al., Banks Have a Solution for Their Identity-Fraud Woes: The DMV. The Wall Street Journal. Nov. 12, 2018. 3 pages, https://www.wsj.com/articles/banks-have-a-solution-for-their-identity-fraud-woes-the-dmv-1542018600?mod=hp_lead_pos7 [last retrieved Nov. 12, 2018].
Duffy, The Top Blockchain Patents Of 2018. Law360. Jan. 7, 2019. 4 pages. https://www.law360.com/articles/1115575/print?section=ip [last retrieved Jan. 15, 2019].
Gupta, Tell Me Who You Are, Dec. 23, 2015. 45 pages.
Karapetsas, Etherium/Wiki White Paper. A Next-Generation Smart Contract and Decentralized Application Platform. https://github.com/ethereum/wiki/wiki/White-Paper#identity-and-reputation-systems, Nov. 21, 2015, archived on Feb. 10, 2016, downloaded on Dec. 22, 2016. 25 pages.
Longley et al., Linked Data Proofs 1.0. Draft Community Group Report. Nov. 1, 2018. 14 pages, https://w3c-dvcg.github.io/ld-proofs [last retrieved Feb. 17, 2019].
Lunkvist, (ConsenSys) Digital Identity, Nov. 2015. 18 pages.
Mainelli et al., Chain of A Lifetime: How Blockchain Technology Might Transform Personal Insurance, Dec. 2014. 51 pages.
O'Byrne, Digital Badges Overview—BadgeChain—Medium. Medium. Mar. 10, 2015. 9 pages, [last accessed Jan. 8, 2017].
Oberhauser et al., Distributed Hosting; A Blockchain Based Distributed Hosting Engine, Mar. 2015. 30 pages.
Oberhauser, A Distributed Computation Engine for Reproducible, Verifiable, Reusable and Transparent Computations. Thesis submitted in partial fulfillment for the degree of Master of Science. Vrije Universiteit Amsterdam. Jan. 2016. 63 pages.
Ravet, From ePortfolios to Open Ledgers—via OpenBadges and BlockChains—BadgeChain—Medium. Medium. Dec. 14, 2015. 9 pages, [last accessed Jan. 8, 2017].
Reed et al., Decentralized Identifiers (DIDs) v0.11. Data Model and Syntaxes for Decentralized Identifiers (DIDs). Draft Community Group Report. Dec. 11, 2018. 41 pages. https://w3c-ccg.github.io/did-spec [last retrieved Dec. 21, 2018].
Reed et al., Decentralized Identifiers (DIDs) v0.11. Data Model and Syntaxes for Decentralized Identifiers (DIDs). Draft Community Group Report. Feb. 4, 2019. 42 pages. https://w3c-ccg.github.io/did-spec [last retrieved Dec. 21, 2018].
Sabadello, A Universal Resolver for self-sovereign identifiers on any blockchain or other decentralized system. Nov. 1, 2017. 6 pages, https://medium.com/decentralized-identity/a-universal-resolver-for-self-sovereign-identifiers-48e6b4a5cc3c [last retrieved Dec. 21, 2018].
Sporny et al., Verifiable Claims Data Model and Representations. W3C First Public Working Draft. Aug. 3, 2017. 34 pages. http://www.w3.org/TR/verifiable-claims-data-model [last retrieved Dec. 21, 2018].
Sporny et al., Verifiable Credentials Data Model 1.0. Expressing verifiable information on the Web. W3C Editor's Draft. Jan. 22, 2019. 83 pages, https://w3c.github.io/vc-data-model [last retrieved Jan. 22, 2019].
Swanson, Consensus-as-a-service: a brief report on the emergence of permissioned, distributed ledger systems, Apr. 6, 2015. 66 pages.
Hardjono et al., Anonymous Identities for Permissioned Blockchains. Draft v06C. petertodd.org. Jan. 24, 2016. 16 pages.

\* cited by examiner

SYSTEMS AND METHODS FOR MANAGING DIGITAL IDENTITIES

RELATED APPLICATIONS

This application is a Continuation of U.S. application Ser. No. 15/950,732, filed Apr. 11, 2018, entitled "SYSTEMS AND METHODS FOR MANAGING DIGITAL IDENTITIES", which is a Continuation-in-part of International Patent Application Serial No. PCT/US2016/057232, filed Oct. 14, 2016, entitled "SYSTEMS AND METHODS FOR MANAGING DIGITAL IDENTITIES", which is a Non-Prov of Prov (35 USC 119(e)) of U.S. Application Ser. No. 62/380,467, filed Aug. 28, 2016, entitled "STRONG DIGITAL IDENTITIES". Application PCT/US2016/057232 is a Non-Prov of Prov (35 USC 119(e)) of U.S. Application Ser. No. 62/325,880, filed Apr. 21, 2016, entitled "COUNTERPARTY CHECKS IN THE CONTEXT OF A BLOCKCHAIN ECOSYSTEM". Application PCT/US2016/057232 is a Non-Prov of Prov (35 USC 119(e)) of U.S. Application Ser. No. 62/264,418, filed Dec. 8, 2015, entitled "SELECTIVE INFORMATION SHARING PLATFORM". Application PCT/US2016/057232 is a Non-Prov of Prov (35 USC 119(e)) of U.S. Application Ser. No. 62/241,436, filed Oct. 14, 2015, entitled "IDENTITY MANAGEMENT WITH A MULTI-BLOCKCHAIN APPROACH". The contents of which are herein incorporated by reference in their entirety.

BACKGROUND

Virtually all organizations (e.g., government agencies, healthcare institutions, financial institutions, retailers, social networking service providers, employers, etc.) collect and maintain personal data. In certain heavily regulated industries, such as banking and insurance, organizations are required to establish rigorous "know your customer" processes to verify customer identities. These processes are important in preventing identity theft, financial fraud, money laundering, and terrorist financing.

Such troves of personal data are frequently misused for financial, political, or other reasons. To protect privacy of their citizens, many governments have adopted regulations that limit how organizations may handle personal data.

SUMMARY

In some embodiments, a computer-implemented method is provided, comprising acts of: using a plurality of measurements taken from a user to generate an identifier for the user, the identifier comprising a cryptographic proof of the plurality of measurements; instantiating a digital identity representation associated with the identifier for the user, the digital identity representation comprising program code that implements rules for attestation; generating an electronic signature over the digital identity representation; and publishing the digital identity representation and the electronic signature to a distributed ledger system.

In some embodiments, a computer-implemented method is provided, comprising acts of: selecting a schema from a plurality of schemas for badges, the schema comprising a plurality of attributes; generating, according to the schema, a badge for use in attesting to an identity of a user, wherein the act of generating comprises: identifying a plurality of values, each value corresponding to an attribute of the plurality of attributes in the schema; generating at least one cryptographic proof for each value of the plurality of values; and identifying a trusted entity for verifying the plurality of values; and publishing the badge to a distributed ledger system.

In some embodiments, a computer-implemented method is provided, comprising: receiving, via a distributed ledger system, a request to verify a badge, the badge comprising a plurality of attribute attestations corresponding respectively to a plurality of attributes for a user, wherein for each attribute, the corresponding attribute attestation comprises a cryptographic proof; receiving, via a channel outside the distributed ledger system, a plurality of values corresponding respectively to the plurality of attributes; for at least one attribute of the plurality of attributes: verifying whether the value corresponding to the at least one attribute is a correct value of the at least one attribute for the user; and in response to verifying that the value corresponding to the at least one attribute is a correct value of the at least one attribute for the user, causing, via the distributed ledger system, the attribute attestation corresponding to the at least one attribute to be in a VERIFIED state.

In some embodiments, a computer-implemented method is provided, comprising: receiving, via a distributed ledger system, a request to verify a first badge, the first badge comprising a plurality of attribute attestations corresponding respectively to a plurality of attributes for a user, wherein for each attribute, the corresponding attribute attestation comprises a cryptographic proof; receiving, via a channel outside the distributed ledger system, a plurality of values corresponding respectively to the plurality of attributes; for at least one attribute of the plurality of attributes: identifying, from the first badge, a first attribute attestation corresponding to the at least one attribute, the first attribute attestation comprising a first cryptographic proof; identifying, from the first attribute attestation, a pointer to a second badge; using the pointer to access the second badge from the distributed ledger; identifying, from the second badge, an entity that is responsible for verifying the second badge, and a second attribute attestation corresponding to the at least one attribute; determining whether to trust the entity responsible for verifying the second badge; and in response to determining that the entity responsible for verifying the second badge is to be trusted, checking whether: (1) the second attribute attestation is in a VERIFIED state; (2) the second cryptographic proof is a valid proof of the received value corresponding to the at least one attribute; and (3) the second attribute attestation is electronically signed by the entity responsible for verifying the second badge.

In some embodiments, a computer-implemented method is provided, comprising acts of: receiving a request to validate at least one statement about a user; identifying, from the request, a reference to a distributed ledger, the reference comprising an identifier for the distributed ledger and an identifier for a transaction recorded on the distributed ledger; identifying, based at least in part on the identifier for the distributed ledger, at least one node of a network of nodes managing the distributed ledger; and communicating with the at least one node to validate the at least one statement about the user.

In accordance with some embodiments, a system is provided, comprising at least one processor and at least one computer-readable storage medium having stored thereon instructions which, when executed, program the at least one processor to perform any of the above methods.

In accordance with some embodiments, at least one computer-readable storage medium having stored thereon instructions which, when executed, program at least one processor to perform any of the above methods.

DETAILED DESCRIPTION

Figure 1:
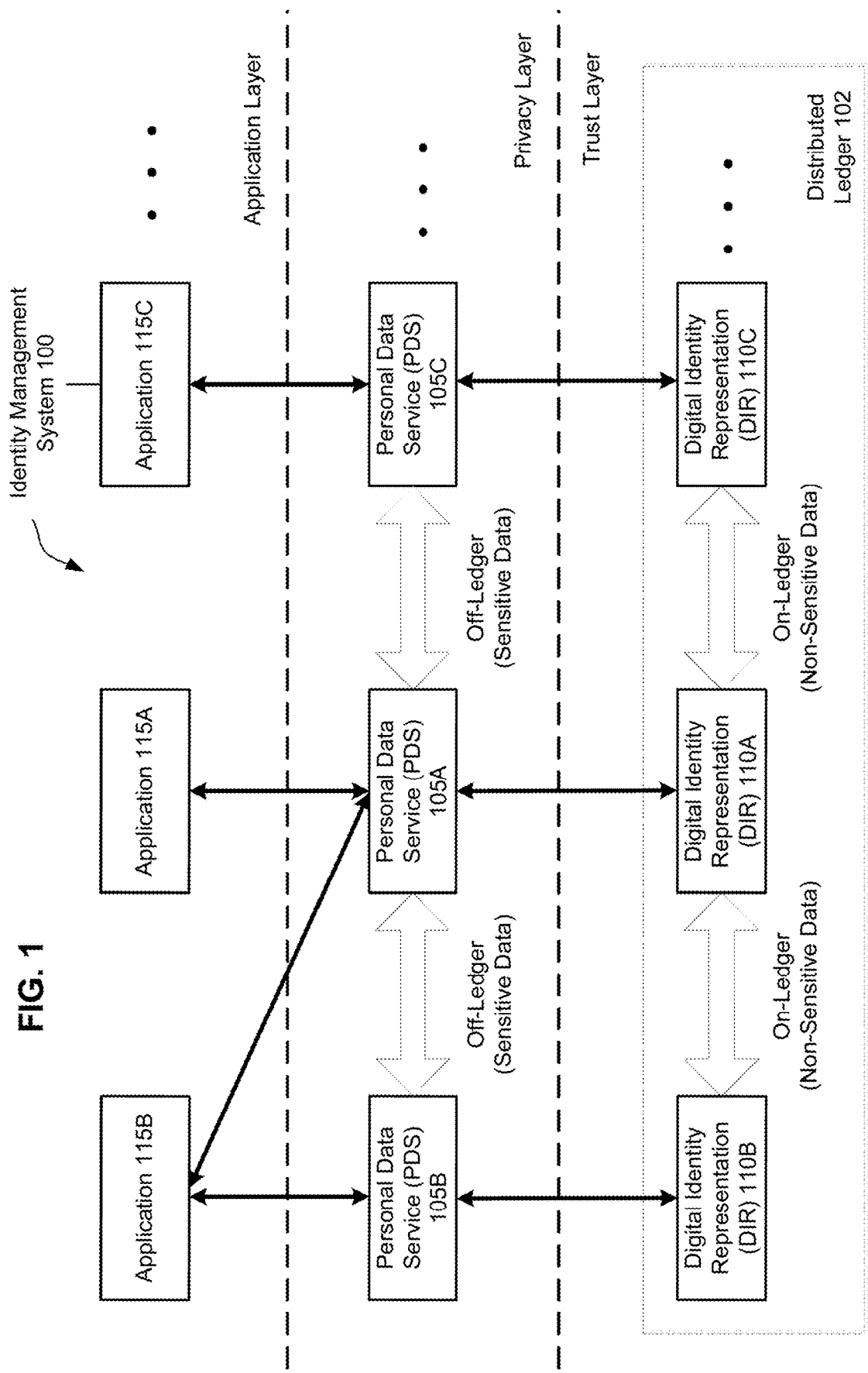
FIG. 1 shows an illustrative identity management system 100, in accordance with some embodiments.

Aspects of the present disclosure relate to systems and methods for managing digital identities.

To comply with privacy regulations that limit sharing of personal data, many organizations implement their own digital identity management systems. The inventors have recognized and appreciated that such an approach may be inefficient. For example, a user may be required to complete a separate identity verification process for each account the user desires to create, such as bank account, brokerage account, insurance account, retirement account, healthcare provider account, utility account, etc. Likewise, a user may be required to complete a separate identity verification process to obtain access to each restricted area, such as an office building, a school campus, a recreational area, etc. During each identity verification process, the user may be required to provide the same personal data (e.g., first name, last name, driving license number, date of birth, social security number, etc.). In some instances, a burdensome identity verification process may delay a transaction, and/or discourage the user from completing the transaction. Accordingly, in some embodiments, techniques are provided for simplifying identity verification processes and thereby improving user experience.

The inventors have recognized and appreciated that inefficiencies may also exist from the organizations' perspective. For example, a customer may already have an account in the United States with Bank A, and may request creation of a new account with the same Bank A in Germany. In this circumstance, Bank A may perform identity verification again, even if the customer's identity was already verified at the time the account in the United States was created. As a consequence, redundant processes may be performed and duplicate records may be maintained, thus wasting time and resources (e.g., processor cycles, storage, etc.). Accordingly, in some embodiments, techniques are provided for reducing redundancies while maintaining a suitable level of security.

I. Personal Data Service

In some embodiments, an owner-centric identity management approach may be provided that allows a user to control how one or more items of Personal Identifying Information (PII) and/or other personal data are shared with an entity (e.g., another user or an organization). For instance, a personal data service (PDS) may be used to store personal data, and may provide a user interface through which the user may manage the personal data (e.g., by adding, deleting, and/or modifying one or more items). Additionally, or alternatively, the PDS may provide one or more application programming interfaces (API) that may be invoked by a software application such as a mobile or web application. For instance, when the user downloads an app and attempts to open an account, the app may invoke an API of the PDS to initiate an identity verification process. The app may inform the PDS which entity is requesting a verification, and/or which items of personal data are to be verified.

In some embodiments, a PDS may be programmed to protect privacy, for example, by restricting access to personal data stored in the PDS. For instance, one or more credentials may be required to authenticate a user attempting to log into the PDS to view or modify the personal data. Additionally, or alternatively, the PDS may share one or more items of the personal data with an entity only when specifically instructed by an authenticated user.

In some embodiments, a PDS may be implemented as a virtual container that includes not only user interface, application programming interface, data management, trust management, and/or other functionalities, but also a runtime environment (e.g., with libraries, configuration files, etc.). The inventors have recognized and appreciated that implementing a PDS as a container may facilitate deployment to different computing platforms. However, it should be appreciated that aspects of the present disclosure are not limited to implementing a PDS as a container, as other implementations may also be suitable.

II. Trust Structure

In some embodiments, a trust structure may be provided to allow attestations (e.g., identity attestations) to be relied upon across multiple entities, thereby reducing redundancies. For instance, if a user has completed an identity verification process with a first organization (e.g., a government agency such as a Department of Motor Vehicles, or DMV), and is attempting to open an account with a second organization (e.g., a utility company), an identity verification process for the second organization may be greatly simplified, as long as the second organization trusts the first organization. Accordingly, in some embodiments, techniques are provided for implementing a trust structure that allows an organization to simply check that an item of personal data has been verified by another organization, without having to verify that item of personal data again.

In some embodiments, a trust structure may be provided that allows a user to precisely specify which items of personal data are to be shared with, and/or proven to, which entity. For instance, when a first organization (e.g., the DMV) verifies multiple items of personal data (e.g., date of birth, social security number, etc.), a separate proof may be provided for each item. In this manner, the user may later decide to submit the proof of a first item (e.g., over 21 years of age) to a second organization (e.g., a bar serving alcoholic beverages), without submitting the proof of a second item (e.g., social security number, home address, or even exact date of birth).

III. Distributed Ledger

The Bitcoin protocol, introduced in 2009, uses a blockchain to provide a digital currency without a central clearing house. The blockchain is shared among multiple nodes in a network and is used to record and check transactions in a cryptographically secure manner. For instance, while new transactions may be appended to the blockchain, past transactions cannot be altered without breaking a chain of cryptographic proofs.

The Bitcoin protocol uses tamper resistance properties of the blockchain to enforce certain rules. For example, once a first entity sends a bitcoin to a second entity, a record of the transaction is propagated through the network, and the transaction cannot be reversed unless an attacker controls more than half of the processing power in the network. In this manner, a third entity may readily discover that the first entity no longer owns the bitcoin, so that the first entity cannot double spend the bitcoin.

The inventors have recognized and appreciated that a distributed ledger, such as a blockchain, may be used in applications other than digital currency. For instance, a distributed ledger may be used to implement a trust structure to allow attestations (e.g., identity attestations) to be relied upon across multiple entities. In some embodiments, a distributed ledger may be used to record attestations by trusted entities, so that other entities need not independently verify the attested facts.

It should be appreciated that a distributed ledger may be implemented in any suitable manner. For instance, in some embodiments, one or more directed acyclic graphs (e.g. IOTA Tangle), hash graphs (e.g. Swirlds), hash trees (e.g. Guardtime keyless signatures infrastructure), and/or distributed ledgers with no globally-shared chain (e.g. R3 Corda), may be used in addition to, or instead of, one or more blockchains.

IV. Identity Management Protocol

The inventors have recognized and appreciated various competing concerns in digital identity management. For instance, it may be desirable to restrict access to a user's personal data (e.g., by storing the personal data in a virtual container controlled by the user), thereby protecting the user's privacy. On the other hand, it may be desirable to use a transparent mechanism for recording attestations (e.g., by storing the attestations in a publicly available data structure that is replicated at multiple nodes in a network), so that an attacker cannot easily forge an attestation. Accordingly, in some embodiments, techniques are provided that allows a user to control how much personal data is shared, while maintaining transparency of attestations. In this manner, a trust structure may be implemented without oversharing of personal data.

In some embodiments, an identity management protocol may be provided to allow privacy protection to be implemented over a transparent mechanism for recording attestations. For instance, a protocol stack may be provided that includes three layers—a trust layer, a privacy layer, and an application layer. The trust layer may include a distributed ledger for storing attestations, the privacy layer may include virtual containers controlled by respective users, and the application layer may include one or more applications that use the identity management protocol to verify identity and/or other personal data.

In some embodiments, different types of data may be exchanged at different layers of an identity management protocol. For instance, sensitive data (e.g., items of PII and/or other personal data) may be exchanged in the privacy layer (e.g., via encrypted communications), whereas non-sensitive data (e.g., cryptographic proofs of items of PII and/or other personal data) may be exchanged in the trust layer. In this manner, a high level of transparency may be provided in the trust layer, without compromising privacy.

In some embodiments, an identity management protocol may be provided where users, as opposed to organizations, control how items of PII and/or other personal data are shared with other entities, while trusted entities attest to veracity of the items of PII and/or other personal data. In this manner, a user may decide precisely which one or more items of personal data to share with another entity (e.g., another user), and the other entity may check that the one or more items of personal data have been verified by one or more trusted entities (e.g., one or more government agencies and/or employers), without having to undergo a burdensome verification process (e.g., physically examining documents such as passports, social security cards, pay slips, etc.).

It should be appreciated that the techniques introduced above and discussed in greater detail below may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the present disclosure are not limited to the use of any particular technique or combination of techniques.

V. Detailed Discussions of Illustrative Embodiments

FIG. 1 shows an illustrative identity management system 100, in accordance with some embodiments. In this example, the identity management system 100 includes an identity management protocol stack having three layers. For instance, there may be a trust layer having a distributed ledger 102 for storing attestations (e.g., identity attestations). Additionally, or alternatively, there may be a privacy layer comprising a plurality of Personal Data Services (PDSes) 105A, 105B, 105C, . . . , and/or an application layer comprising a plurality of applications 115A, 115B, 115C, . . . . The PDSes may store personal data of respective users who engage in transactions via the applications (e.g., opening an account, making a purchase, etc.).

In some embodiments, a PDS may include a software program for managing PII and/or other personal data. For instance, a PDS may be implemented as a virtual container that wraps the software program in a file system to allow the software program to run consistently in any environment. For instance, the file system may include a runtime system, one or more system tools, one or more system libraries, etc. However, it should be appreciated that aspects of the present disclosure are not so limited. Alternatively, or additionally, a PDS may simply include a software program for managing personal data, without an accompanying file system.

In some embodiments, a PDS may be associated with a digital identity representation (DIR) in the distributed ledger 102. For instance, the PDSes 105A, 105B, 105C, . . . may be associated with DIRs 110A, 110B, 110C, . . . , respectively.

In some embodiments, each individual user may control a PDS and a corresponding DIR. The PDS may store sensitive data (e.g., items of PII and/or other personal data), whereas the corresponding DIR may store non-sensitive data (e.g., cryptographic proofs of items of PII and/or other personal data). The PDSes may communicate with each other and share sensitive data in a secure manner, whereas the DIRs may record non-sensitive data (e.g., cryptographic proofs of items of PII and/or other personal data) in the distributed ledger 102.

In some embodiments, cryptographic proofs may be derived in a known manner from items of personal data, and may be signed by trusted entities which verified veracity of the items of personal data. An entity with which a user has shared an item of personal data (e.g., a social security number) may readily check that an alleged cryptographic proof was indeed derived from the item of personal data, and that the cryptographic proof was indeed signed by a trusted entity (e.g., a government agency or an employer). However, it may be computationally infeasible for another entity to reconstruct the item of personal data from the cryptographic proof alone. In this manner, competing objectives of privacy and transparency may be achieved simultaneously.

In some embodiments, the distributed ledger 102 may include digital records replicated among a plurality of nodes in a peer-to-peer network. The nodes may carry out a synchronization protocol, whereby a change made at a node to a local copy of a digital record may be propagated through the network, and other nodes may update their respective copies of the same digital record accordingly.

In some embodiments, the distributed ledger may be implemented using a blockchain. The blockchain may include a plurality of blocks, where each block may include a plurality of transactions. In some embodiments, the plurality of transactions may be ordered, for example, chronologically. Additionally, or alternatively, the plurality of blocks may be ordered, where each newly added block may be linked to a latest previously block. In some embodiments, such a structure may be tamper resistant, and may therefore be used to confirm whether a given transaction did take place, and/or when the transaction took place. For instance, a block may be added to the blockchain only if all nodes (or a subset of nodes with sufficient computation power) in a network implementing the blockchain agree on the block.

In some embodiments, a block generating node (sometimes called a miner) may invest computation power to generate a new block that is linked to a latest previous block. The fastest node that is able to solve a computationally intensive mathematical puzzle (e.g., identifying a preimage of a hash with a certain number of leading zeros) gets rewarded with an internal digital asset (e.g., a bitcoin). Depending on how much computation power is available in the network at a given point in time, a more or less complex mathematical puzzle may be used. In this manner, blocks may be generated in a selected time window, and conflicts may be reduced.

It should be appreciated that aspects of the present disclosure are not limited to the use of a proof-of-work approach such as the one described above. In some embodiments, a proof-of-stake approach may be used to achieve distributed consensus. Furthermore, it should be appreciated that any suitable blockchain implementation may be used to provide a trust layer, including, but not limited to, Ethereum and Hyperledger Fabric.

Figure 2:
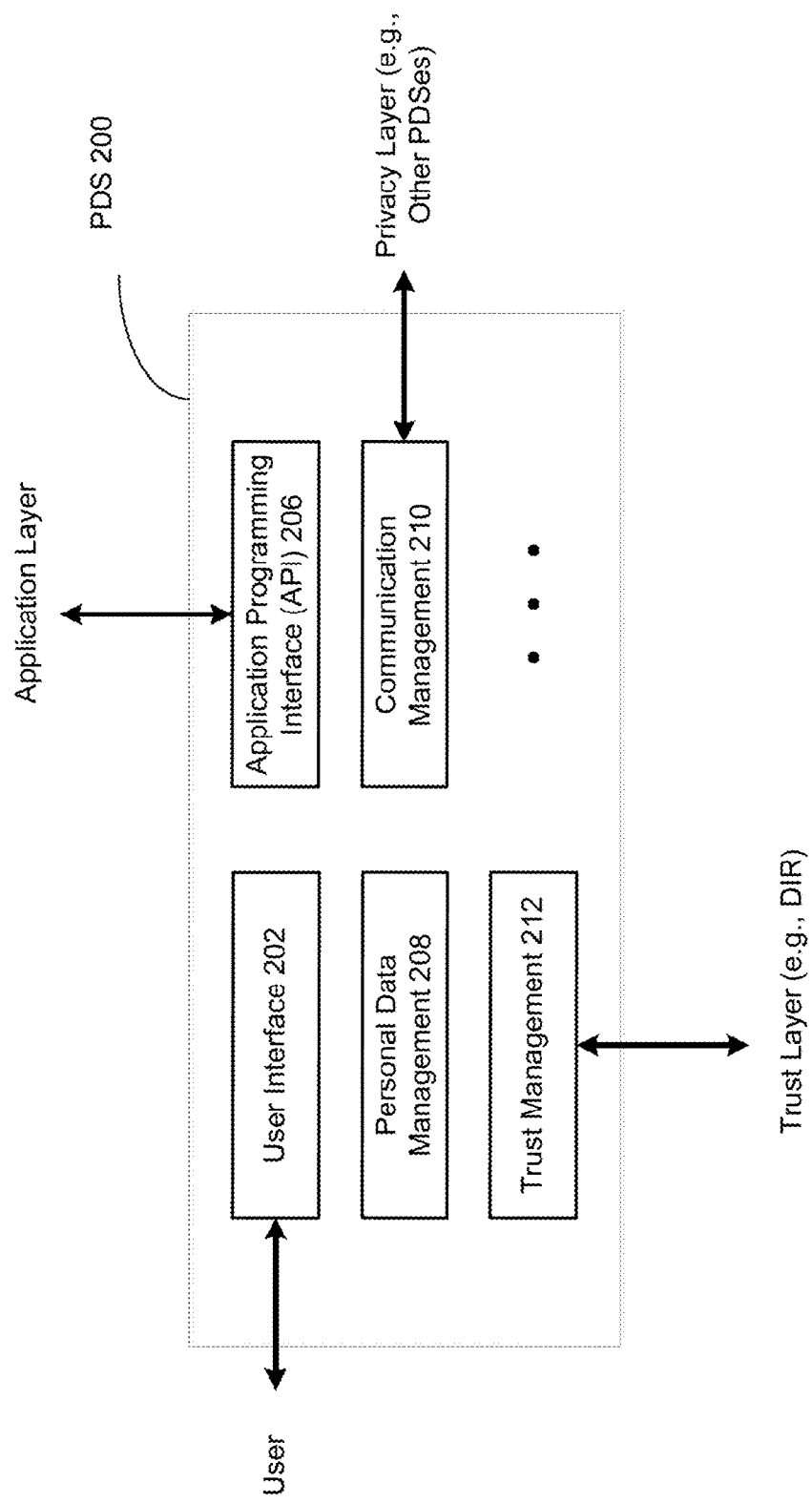
FIG. 2 shows an illustrative Personal Data Service (PDS) 200, in accordance with some embodiments.

FIG. 2 shows an illustrative PDS 200, in accordance with some embodiments. For instance, the PDS 200 may be one of the illustrative PDSes 105A-C in the illustrative privacy layer shown in FIG. 1. In some embodiments, the PDS 200 may be used by an individual user to manage the user's digital identity. As one example, the user may be an employee of a company and may use the PDS 200 to request that the company sign a cryptographic proof of the user's annual income. Additionally, or alternatively, the company may use a PDS similar to the PDS 200 to sign the cryptographic proof and publish the signature to a distributed ledger (e.g., the illustrative distributed ledger 102 shown in FIG. 1).

As another example, the user may be a customer of a car dealer, and may use the PDS 200 to prove the user's annual income to the car dealer. Additionally, or alternatively, the car dealer may use a PDS similar to the PDS 200 to look up from a distributed ledger (e.g., the illustrative distributed ledger 102 shown in FIG. 1) an alleged cryptographic proof of an annual income figure provided by the user, and an alleged signature of the alleged cryptographic proof. The car dealer's PDS may check that the alleged cryptographic proof was indeed derived from the annual income figure provided by the user, and the cryptographic proof was indeed signed by the user's employer.

In some embodiments, the PDS 200 may include a user interface 202 and a personal data management component 208. The user interface 202 and the personal data management component 208 may allow the user to store PII and/or other personal data, and to manage (e.g., add, delete, modify, share, etc.) the stored data. In some embodiment, the user interface 202 may use a multifactor authentication mechanism to restrict access to the stored data and various functionalities of the PDS 200.

In some embodiments, the personal data management component 208 may maintain an audit trail of some or all actions performed via the user interface 202. This may allow the user to identify any unauthorized action (e.g., by an attacker using credentials stolen from the user). Additionally, or alternatively, the audit trail may be used by an investigator to determine if the user engaged in any fraudulent behavior.

In some embodiments, the user interface 202 and the personal data management component 208 may allow the user to specify and/or approve sharing of one or more items of personal data with another entity. Additionally, or alternatively, the personal data management component 208 may apply one or more rules to manage sharing of one or more items of personal data with another entity. For instance, a rule may specify one or more conditions and may be triggered when the one or more conditions are satisfied in a present context. The rule may further specify one or more items of personal data to be shared, and/or one or more entities with which one or more items of personal data are to be shared. In some embodiments, the user may be notified each time a rule is triggered, and the proposed sharing of personal data is carried out only with the user's consent. However, that is not required, as in some embodiments the user may pre-approve the sharing of personal data under a certain rule.

In some embodiments, a rule may be specified by the user, or learned over time (e.g., using one or more machine learning algorithms) from the user's behaviors and/or contexts in which the user's behaviors are observed. Additionally, or alternatively, a rule pertaining to one or more items of personal data may be retrieved from a trusted entity responsible for attesting to veracity of the one or more items of personal data Returning to FIG. 2, the PDS 200 may, in some embodiments, include an API 206, via which the PDS 200 may interact with one or more applications (e.g., the illustrative applications 115A-C in the illustrative application layer shown in FIG. 1). As one example, the PDS 200 may interact with a payroll management application of an employer to request attestation of the user's annual income. As another example, the PDS 200 may interact with a loan processing application of a car dealer to prove the user's annual income. Other examples of applications include, but are not limited to, contract signing, educational status verification, credit score verification, digital access control, physical access control, etc.

In some embodiments, the PDS 200 may include a communication management component 210, via which the PDS 200 may communicate with one or more other PDSes (e.g., the illustrative PDSes 105A-C in the illustrative privacy layer shown in FIG. 1). As one example, the PDS 200 may communicate with a PDS of the user's employer to request that the employer sign a cryptographic proof of the user's annual income. As another example, the PDS 200 may communicate with a PDS of a car dealer to prove the user's annual income, so that the user may obtain a car loan.

In some embodiments, the PDS 200 may include a trust management component 212, via which the PDS 200 may manage a DIR (e.g., one of the illustrative DIRs 110A-C in the illustrative trust layer shown in FIG. 1) in a distributed ledger (e.g., the illustrative distributed ledger 102 shown in FIG. 1). For instance, the trust management component 212 may include program logic to manage the DIR based on contextual information (e.g., which application is invoking the PDS 200). The program logic may cause a state change in the DIR, for example, based on an instruction received from the user via the user interface 202, an input from an application via the API 206, an off-ledger communications received from another PDS via the communication component 210, etc.

In some embodiments, the PDS 200 may be a direct participant in one or more distributed ledgers (e.g., the illustrative distributed ledger 102 shown in FIG. 1). Additionally, or alternatively, the PDS 200 may interact with a trusted entity that manages one or more distributed ledgers on behalf of the PDS 200. In some embodiments, one or more criteria may be used to determine whether the PDS 200 participates directly or indirectly, or both, including, but not limited to, system deployment and/or application considerations.

Although details of implementation of a PDS are shown in FIG. 2 and discussed above, it should be appreciated that aspects of the present disclosure are not limited to the use of any particular component, or combination of components, or to any particular arrangement of components. For instance, in some embodiments, a PDS may be provided that supports dynamically extensible functionalities, based on a core that manages locally stored data. For instance, a module architecture (e.g., a microservice architecture) may be used so that a PDS may be readily adapted to meet changing needs (e.g., new use cases and/or process flows)

Figure 3:
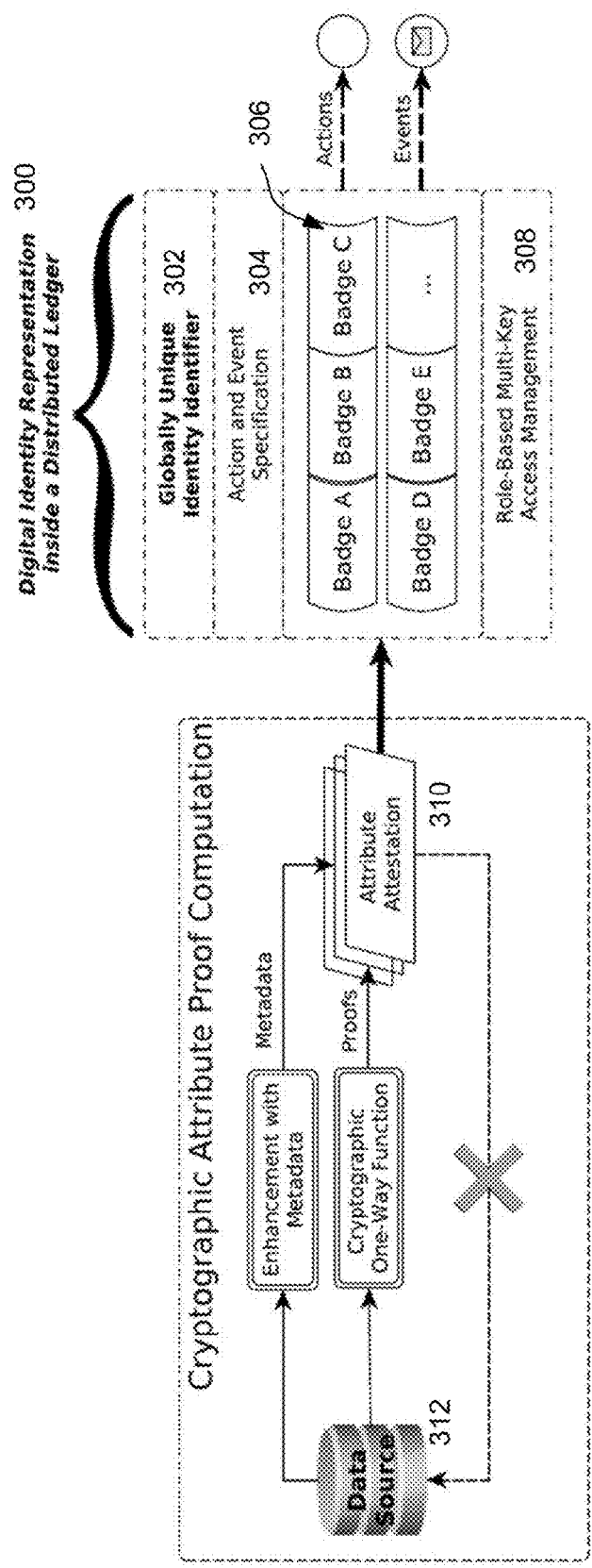
FIG. 3 shows an illustrative Digital Identity Representation (DIR) 300, in accordance with some embodiments.

FIG. 3 shows an illustrative DIR 300, in accordance with some embodiments. For instance, the DIR 300 may be one of the illustrative DIRs 110A-C in the illustrative trust layer shown in FIG. 1. In some embodiments, the DIR 300 may be controlled by a PDS (e.g., the illustrative PDS 200 shown in FIG. 2).

In some embodiments, the DIR 300 may be implemented in a distributed ledger (e.g., the illustrative distributed ledger 102 shown in FIG. 1), and an identifier may be used to reference the DIR 300 in the distributed ledger. In the example shown in FIG. 3, the DIR 300 is referenced using a globally unique identity identifier (GUII) 302, so that no two DIRs in the distributed ledger share a same identifier. In some embodiments, each DIR may be controlled by a PDS, and the GUII for the DIR may be generated based on one or more metrics of the user associated with the PDS. A combination of metrics may be selected so that, given any two users, it is highly unlikely that the DIRs for the two users have the same GUII, thereby making it highly unlikely that a user is able to create more than one DIR. Examples of metrics include, but are not limited to, biometrics (e.g., fingerprint scan, retina scan, voiceprint, etc.), behavior metrics (e.g., location history, walking pattern, sleeping pattern, etc.), etc.

In some embodiments, a cryptographic one-way function may be used to generate a GUII from one or more underlying metric values, so that the one or more values may remain private even if the GUII is made publicly available. Underlying metric values may be stored securely by a corresponding PDS, along with metadata that indicates one or more algorithms used to generate the GUII from the underlying metric values. A high level of security may be imposed on the underlying metric values. For example, the underlying metric values may not be shared with other entities.

In some embodiments, a DIR may serve as a public data repository for non-sensitive data, and may include logic that governs access to such data. For instance, in the example shown in FIG. 3, the DIR 300 includes non-sensitive data organized in one or more badges 306, and an action and event specification 304 that specifies actions that may be performed via the DIR 300 and/or events that may be triggered by changes in the DIR 300. For instance, to provide transparency, stakeholders maintaining the distributed ledger may be notified each time a change is made in the DIR 300.

In some embodiments, the DIR 300 may, at any given time, be in one of a plurality of possible states. For instance, a badge 306 in the DIR 300 may include one or more attribute attestations 310, and an attribute attestation may be in one of several states (e.g., PENDING, VERIFIED, INVALID, EXPIRED, etc.). An overall state of the DIR 300 may depend on states of some or all of the constituent attribute attestations of the DIR 300.

In some embodiments, a change of the DIR 300 from a first state to a second state may occur via a transaction in the distributed ledger. Once the transaction is confirmed by a majority of stakeholders maintaining the distributed ledger, the DIR 300 may remain in the second state until another transaction is confirmed. In some embodiments, all state changes of the DIR 300 may be recorded in the distributed ledger and may be visible to all stakeholders, resulting in a transparent audit trail.

In some embodiments, the DIR 300 may include rules that govern how state transitions may be triggered, and/or which entities may trigger which transitions. For instance, such rules may be captured by the action and event specification 304 of the DIR 300. Once the DIR 300 is set up and deployed via the distributed ledger, program logic in the action and event specification 304 may no longer be changed, and the distributed ledger may ensure that state changes of the DIR 300 comply with the action and event specification 304.

In some embodiments, only one or more authorized entities may be allowed to create transactions and thereby cause state changes of the DIR 300. Each transaction may be signed by an entity creating the transaction. In this way, state changes of the DIR 300 may be auditable. In some embodiments, multiple entities may be involved in causing a state change. All, or least a threshold number of the entities, may be required to sign within a selected time interval, or the state change may not be confirmed.

In some embodiments, an attribute may include an item of personal data, a name for the item of personal data, and/or relevant metadata. For instance, a direct attribute may include an item of PII, such as first name, last name, date of birth, place of birth, passport number, driver's license number, social security number, address, phone number, insurance identification number, fingerprint scan, retina scan, voiceprint, etc. An indirect attribute may include other personal data, such as a property owned (e.g., vehicle, real estate, etc.), status of the property, etc. Additionally, or alternatively, an indirect attribute (e.g., at least 21 years of age) may be derived from a direct attribute (e.g., date of birth).

The inventors have recognized and appreciated that veracity of an attribute value may be proven in a privacy preserving manner, without resorting to the use of a central clearing house. For instance, in some embodiments, a pseudonym of an attribute value, instead of the attribute itself, may be stored in distributed ledger. In this way, the pseudonym of the attribute value may be replicated throughout the network, without exposing the attribute value itself.

In some embodiments, a pseudonym of an attribute value may be computed using a cryptographic one-way function. For instance, with reference to the example shown in FIG. 3, one or more attributes may be stored in a data source 312, which may be maintained by the PDS controlling the DIR 300 (e.g., by the illustrative personal data management component 208 shown in FIG. 2). In some embodiments, an attribute may be retrieved from the data source 312, and a cryptographic one-way function may be applied to a value of the attribute to derive a proof of the attribute. The proof and/or relevant metadata (e.g., a timestamp indicative of when the proof is generated), but not the value itself, may be included in the attribute attestation 310. In this manner, the attribute attestation 310 may be published to the distributed ledger without exposing the value of the attribute.

The inventors have recognized and appreciated that it may be desirable to provide a mechanism for managing attribute attestations in a granular way. Accordingly, in some embodiments, attribute attestations are arranged into one or more badges (e.g., the illustrative badges 306 shown in FIG. 6) that are separately managed.

In some embodiments, a user may designate a trusted entity as being responsible for a badge. For each attribute in the badge, the trusted entity may verify veracity of a value provided by the user for the attribute, check that a proof provided in the badge for the attribute is indeed computed from the value provided by the user, and/or sign the proof. As discussed above, the proofs may be included in a badge and published to the distributed ledger, but the values themselves may not be. Any entity may serve as a trusted entity, such a government agency, an employer, a financial institution, an educational institution, etc.

In some embodiments, a badge may be a data structure having a plurality of fields. A non-limiting example of a badge is provided below.

```
{
    label:          "KYC by Trusted Bank"
    trustedParty:   "trusted_party_identifier"
    proofAlgo:      "PBKDF2_SHA256_100000_3"
    salt:           "081627c0583380...83d51cdfdb1c8"
    schemaURI:      "http://schemas.example.org/strictKYCschema"
    attributes:     [
        {
            label:          "firstname"
            proof:          "db74c940d447e877d...cbc319bcfaeab97a"
            state:          "PENDING"
            confirmedAt:    "1469633204"
            references:     [
                {
                    badgeLabel:        "badgeX"
                    attributeLabel:    "firstname"
                    state:             "ACTIVE"
                }
            ]
        }
        {
            label:          "lastname"
            proof:          "55b5c51f867018...187e39a768aa8231ac"
            state:          "PENDING"
            confirmedAt:    "1469633204"
            references:     [
                {
                    badgeLabel:        "badgeX"
                    attributeLabel:    "lastname"
                    state:             "ACTIVE"
                }
            ]
        }
        {
            label:          "ssn"
            proof:          "efa5ff7eefcfbe4...e15edbb2095934aa0e0"
            state:          "PENDING"
            expiryPeriod:   "1_YEAR"
            confirmedAt:    "1469633204"
        }
        { /* more attributes */ }
    ]
}
```

In the above example, the badge is a data structure that includes fields such as "label," "trustedParty," "proofAlgo," "salt," "schemaURI," and "attributes." In some embodiments, the "label" field may uniquely identify the badge in a DIR. Such a field may simplify access to different badges within a DIR.

In some embodiments, the "trustedParty" field may include a reference to a trusted entity. In some embodiments, the referenced trusted entity may be given access to the badge, and only the referenced trusted entity may be authorized to cause a state change of an attribute attestation in the badge.

In some embodiments, the "proofAlg" field may identify an algorithm used to compute one or more cryptographic proofs stored in the badge. The algorithm may make use of a cryptographic one-way function, such as a hash function. As an example, a Password-Based Key Derivation Function 2 (PBKDF2) may be used, for instance, with a selected pseudorandom function (e.g., SHA256), a selected number of iterations of the pseudorandom function (e.g., 10,000), and/or a selected number of output bytes (e.g., 32). However, it should be appreciated that aspects of the present disclosure are not limited to the use of any particular algorithm to compute cryptographic proofs.

In some embodiments, the "salt" field may store a random value to be used as input to a cryptographic one-way function in computing a cryptographic proof.

In some embodiments, the "schemaURI" field may include a reference to a schema used to create the badge. A non-limiting example of a schema is provided below.

In some embodiments, the "attributes" field may include one or more attribute attestations, where each attribute attestation may itself be a data structure having one or more fields. For example, an attribute attestation may include fields such as "label," "proof," "state," "expiryPeriod," "confirmedAt," and "references."

In some embodiments, the "label" field may be used to uniquely identify the attribute attestation in the badge.

In some embodiments, the "proof" field may store a cryptographic proof of a value of an attribute being attested. For example, the cryptographic proof may be computed using the algorithm specified in "proofAlg" field, with the random value stored in the "salt" field as an additional input.

Figure 4:
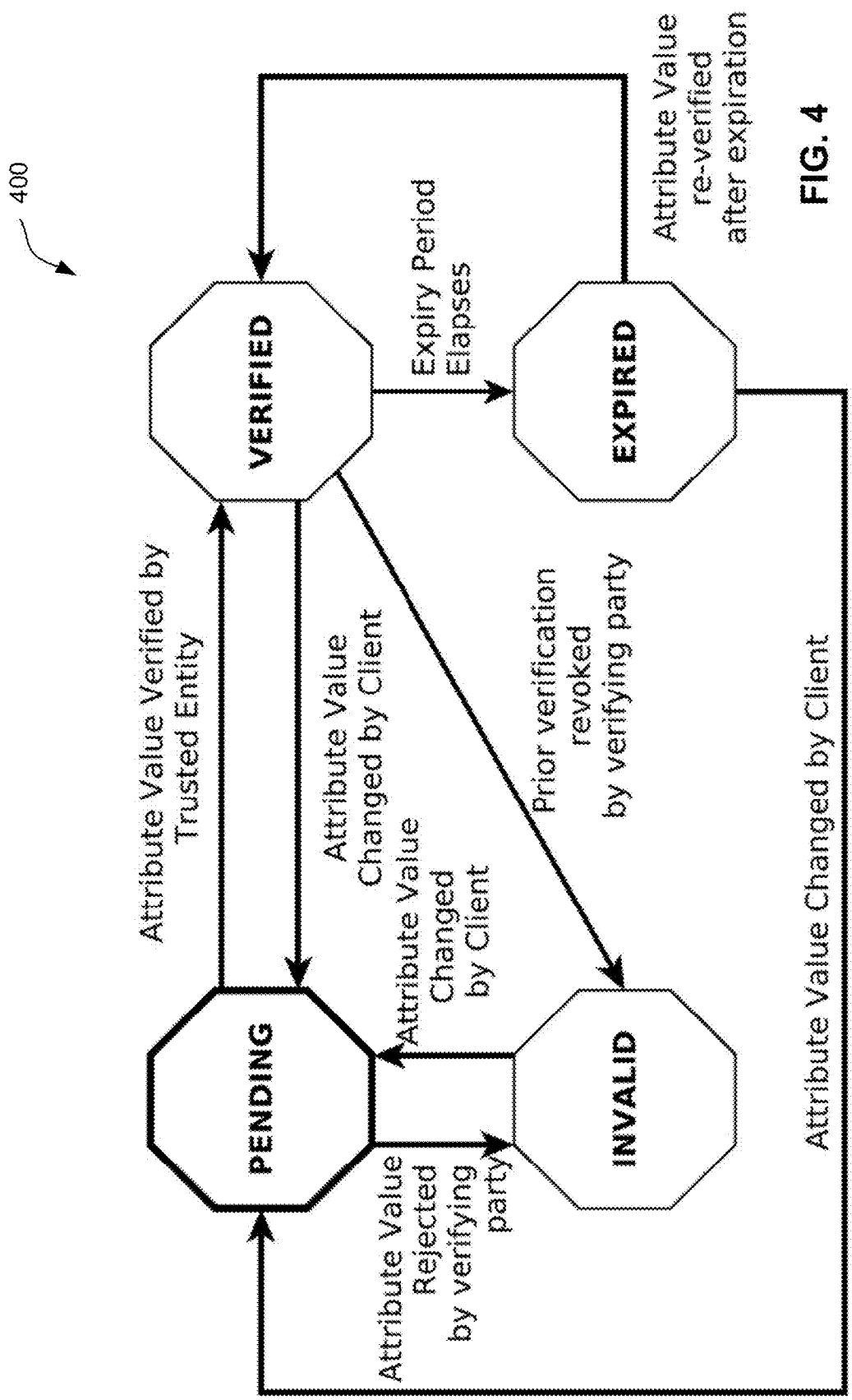
FIG. 4 shows an illustrative state machine 400 that governs transitions among different states of an attribute attestation, in accordance with some embodiments.

In some embodiments, the "state" field may store a current state of the attribute attestation. For instance, at any given time, the attribute attestation may be in one of the following states: PENDING, VERIFIED, INVALID, or EXPIRED. An illustrative state machine that governs transitions among these states is shown in FIG. 4 and described below.

In some embodiments, the "confirmedAt" field may indicate a time at which the badge was last confirmed by the distributed ledger.

In some embodiments, the "expiryPeriod" field may indicate a length of time for which the attribute attestation may remain at the VERIFIED state. For instance, an expiry date may be computed as follows: expiryDate=confirmedAt+expiryPeriod. When the expiry date is reached, an internal transition may be triggered and the attribute attestation may move from the VERIFIED state to the INVALID state.

In some embodiments, the "references" field may include a reference to a corresponding attribute attestation in another badge. For instance, the "references" field may include a "badgeLabel" field storing a label of the other badge, an "attributeLabel" field storing a label of the referenced attribute attestation in the other badge, and a "state" field that indicates a state of the referenced attribute attestation (e.g., ACTIVE, INVALIDATED, EXPIRED, etc.).

The inventors have recognized and appreciated that a reference from an attribute attestation in a first badge to a corresponding attribute attestation in a second badge in the same DIR may allow the trusted entity responsible for the first badge to rely upon the corresponding attribute attestation in the second badge. For instance, in the above example, when the user requests the trusted entity identified in the "trustedParty" field to verify a value (e.g., John) of the attribute attestation labeled "firstname," the trusted entity may check a corresponding attribute attestation in another badge (e.g., an attribute labeled "firstname" in a badge labeled "badgeX"). If the check is successful, the trusted entity may sign the proof stored in the "proof" field of the attribute attestation labeled "firstname," without having to complete a burdensome verification process (e.g., physically examining the user's passport to confirm that the user's first name is indeed John).

In some embodiments, to check the corresponding attribute attestation in the other badge, the trusted entity may use the label stored in the "badgeLabel" field (e.g., "badgeX") to look up the other badge, and may use the label stored in the "attributeLabel" field (e.g., "firstname") to look up the corresponding attribute attestation in the other badge. The trusted entity may check that the corresponding attribute is in a "VALID" state, and may apply an algorithm indicated in an "proofAlgo" field of the other badge to the attribute value provided by the user (e.g., John) and a salt stored in a "salt" field of the other badge to check that a proof stored in the "proof" field of the corresponding attribute attestation was indeed generated by applying that algorithm to the attribute value and that salt.

In some embodiments, the trusted entity may rely upon the corresponding attribute attestation in the other badge only if the trusted entity trusts an entity identified in the "trustedParty" field of the other badge. For instance, the trusted entity may decide to rely upon the attestation if the entity identified in the "trustedParty" field of the other badge is a government agency, but may decide not to rely upon the attestation if the entity identified in the "trustedParty" field of the other badge is an individual or organization unknown to the trusted entity.

While the inventors have recognized and appreciated various advantages of organizing attribute attestations into badges, it should be appreciated that aspects of the present disclosure are not limited to the particular examples provided herein, or to the use of badges at all. In some embodiments, attribute attestations may be organized in a different way, or may be managed individually.

In some embodiments, a cryptographic one-way function may be used in combination with a public salt and/or one or more private salts. For instance, a public salt may be a random value that is shared by all attribute attestations in the badge, computed during badge creation, and published to the distributed ledger. Such a public salt may be used as a binding value to the badge.

By contrast, in some embodiments, a private salt may be a random value that is computed independently for each attribute, each time a value of the attribute is verified, and not published to the distributed ledger. To allow a trusted entity to verify a value of the attribute, the private salt computed for that attribute and that particular verification may be shared with the trusted entity via a secure off-ledger channel, along with the value of the attribute.

In some embodiments, a cryptographic proof of an attribute value may be computed as follows:
 (1) public_salt=random(X),
   where the function random( ) on input X outputs a random byte sequence of length X.

(2) private_salt=random(Y),
where the function random( ) on input Y outputs a random byte sequence of length Y.

(3) proof=HASH(public_salt∥private_salt∥attribute_value),
where ∥ is a byte sequence concatenation function.

In some embodiments, the function HASH( ) may be a one-way function that is more complex than a simple cryptographic hash. For example, a PBKDF2 algorithm may be used in conjunction with a strong hash function (e.g., SHA256), a sufficiently large number of iterations (e.g., 10,000)), and/or a sufficiently large number of output bytes (e.g., 32) to slow down potential attackers, thereby improving resistance to targeted brute force attacks. However, it should be appreciated that aspects of the present disclosure are not limited to the use of any particular proof algorithm. In some embodiments, different proof algorithms may be used for different badges, even those in the same DIR.

In some embodiments, to improve security, salt values may be selected to have at least as many bits as an output of the function HASH( ). Such salts may be computed independently in a PDS. For instance, public salts may not be reused across badges, and private salts may not be reused across attribute attestations.

The inventors have recognized and appreciated that the use of a private salt may allow invalidation of an existing attestation, even if the attribute value does not change. For instance, an attesting entity (e.g., a credit bureau) may replace a previous attestation with a new attestation by using a new private salt to generate a new proof for the same attribute value. However, aspects of the present disclosure are not limited to the use of a private salt, as in some embodiments no private salt may be used and hence all previous attestations may remain valid. Also, aspects of the present disclosure are not limited to the use of a public salt. For instance, in some embodiments, private salts may be used instead of a public salt.

In some embodiments, a badge may be created based on a badge schema (which may be referenced in a "schema" field of the badge). A badge schema may describe which pieces of data may be stored in a badge, how the pieces of data may be organized, semantic relationships among the pieces of data, and/or rules that govern how the pieces of data may be managed. In some embodiments, a badge schema may be written using a semantic language such as W3C Web Ontology Language (OWL) or Resource Description Framework Schema (RDFS). However, that is not required, as in some embodiments a markup language such as XML may also be used. A non-limiting example of a badge schema is provided below.

```
{
    Id: "http://schemas.example.org/strictKYCSchema"
    schemaType: "001 - KYC for Individuals"
    riskProfile: "Low"
    description: "The following schema defines attributes needed for a Know Your
    Customer (KYC) check of a low risk individual."
    attributes: [
        {
            label: "firstname"
            description: "The first name of the person as specified."
            required: true
            validationCriteria: "Must match the first name on a government issued
            photo ID. Checked in person or via high quality scan of the photo ID,
            transmitted via secure digital channel."
            enhancedPrivacy: "The label can be protected by substituting the label
            'firstname' with a related one-way salted hash."
            storageLocation: "PDS"
            dataType: "String"
            format: "Plaintext or Hashed"
        }
        {
            label: "lastname"
            required: true
            validationCriteria: "Must match the last name on the government
            issued photo ID used to check the first name. Checked in person or via
            high quality scan of the photo ID, transmitted via secure digital
            channel."
            enhancedPrivacy: "The label can be protected by substituting the label
            'lastname' with a related one-way salted hash."
            storageLocation: "PDS"
            dataType: "String"
            format: "Plaintext or Hashed"
        }
        {
            label: "ssn"
            required: true
            validationCriteria: "Social Security Number must be related to the
            same person shown on the government issued photo ID used to check
            the first name and the last name "
            enhancedPrivacy: "The label can be protected by substituting the label
            'ssn' with a related one-way salted hash."
            dataType: "String"
            storageLocation: "PDS"
            format: "Plaintext or Hashed"
        }
        { /* more attribute specifications */ }
    ]
}
```

In the above example, the badge schema defines a set of attributes for which attestations may be included in a badge. Each attribute attestation may be populated when the badge is created, or added to the badge at a later time. In some embodiments, a badge schema may define one or more rules that govern how an attribute attestation is to be managed. For example, a rule may specify that an expiry period for an attribute attestation must be between 5 years and 10 years.

The inventors have recognized and appreciated that badge schemas may allow badges to be created in a standardized way. This may simplify mapping between badges created for different purposes, which may in turn improve interoperability of different systems within the same vertical (e.g., different financial institutions) or across different verticals (e.g., a government agency such as the Transportation Security Administration, or TSA, using a banking Know Your Customer, or KYC, schema to verify passenger identities). However, it should be appreciated that aspects of the present disclosure are not limited to the use of badge schemas to create badges.

FIG. 4 shows an illustrative state machine 400 that governs transitions among different states of an attribute attestation, in accordance with some embodiments. For instance, the state machine 400 may govern state transitions of attribute attestations in one or more of the illustrative badges 306 shown in FIG. 3.

In some embodiments, when a badge is created with an attribute attestation (or when an attribute attestation is added to an existing badge), the attribute attestation may be initialized to a PENDING state. In this state, the attribute attestation may be neither valid nor invalid.

In some embodiments, a user for whom the badge is created may request that a trusted entity associated with the badge verify a value of the attribute. If the trusted entity verifies the value of the attribute, the trusted entity may cause the attribute attestation to be in a VERIFIED state. If the trusted entity rejects the value of the attribute, the trusted entity may cause the attribute attestation to be in an INVALID state.

In some embodiments, if the attribute attestation is in the VERIFIED state, the EXPIRED state, or the INVALID state, and the user causes the attribute to have a different value, the attribute attestation may return to the PENDING state.

In some embodiments, if the attribute attestation is in the VERIFIED state, and the trusted entity revokes the previous verification, the trusted entity may cause the attribute attestation to be in the INVALID state.

In some embodiments, if the attribute attestation is in the VERIFIED state, and an expiry period elapses, the attribute attestation may move into an EXPIRED state, where the attribute attestation may remain until the trusted entity re-verifies the value of the attribute.

It should be appreciated that the state machine 400 is shown in FIG. 4 and described above solely for purposes of illustration, as aspects of the present disclosure are not limited to any particular combination of states and/or state transitions.

In some embodiments, a state of a referencing attribute attestation may be synchronized with that of a referenced attribute attestation. However, that is not required, as in some embodiments state changes of a referencing attribute attestation may be independent of state changes of a referenced attribute attestation.

As discussed above, a DIR may include rules that govern how state transitions may be triggered, and/or which entities may trigger which transitions. For instance, such rules may be captured by an action and event specification (e.g., the illustrative action and event specification 304 shown in FIG. 3). Non-limiting examples of actions (e.g., state changes and/or proof updates) that may be performed via a DIR are listed in the table below.

| Action | Input/Output | Attribute State(s) | Side-Effect |
|---|---|---|---|
| createBadge | Input (1) Badge Label (2) Trusted Entity Output: None | None | "Badge Created Event" Triggered |
| setAttribute | (1) Badge Label (2) Attribute Label (3) Attribute Proof | PENDING | "Attribute Set Event" Triggered |
| submitVerificationRequest | Input (1) Badge Label Output: None | None | "Verification Request Event" Triggered |
| changeAttributeState | Input (1) Badge Label (2) Attribute Label (3) Attribute State Output: None | PENDING to VERIFIED or INVALID | "Attribute State Change Event" Triggered |

In some embodiments, a "createBadge" action may take as input a badge label and an identifier for a trusted entity. As a result of a DIR of a user executing the "createBadge" action, a badge may be created with the input badge label in a "label" field and the input trusted entity identifier in a "trustedParty" field. Additionally, or alternatively, a "Badge Created" event may be triggered, which may publish the newly created badge to the distributed ledger.

In some embodiments, a "setAttribute" action may take as input a badge label, an attribute label, and an attribute proof. As a result of a DIR of a user executing the "setAttribute" action, an "attributes" field of a badge identified by the input badge label may be updated. For instance, an attribute attestation identified by the input attribute label may be added and/or modified with the input attribute proof in a "proof" field. Additionally, or alternatively, a state of the attribute attestation may be set to PENDING, and/or an "Attribute Set" event may be triggered, which may publish these changes to the attribute attestation to the distributed ledger.

In some embodiments, a "submitVerificationRequest" action may take as input a badge label. As a result of a DIR of a user executing the "setAttribute" action, a "Verification Request" event may be triggered, which may cause a verification request to be sent to a DIR of a trusted entity responsible for the badge identified by the input badge label.

In some embodiments, a "changeAttributeState" action may take as input a badge label, an attribute label, and an attribute state (e.g., VERIFIED or INVALID). As a result of a DIR of a trusted entity executing the "changeAttributeState" action, an "attributes" field of a badge identified by the input badge label may be updated. For instance, an attribute attestation identified by the input attribute label may be modified with the input attribute state (e.g., VERIFIED or INVALID) in a "state" field. Additionally, or alternatively, an "Attribute State Change" event may be triggered, which may publish this change to the attribute attestation to the distributed ledger.

Non-limiting examples of "Badge Created," "Attribute Set," "Verification Request," and "Attribute State Change" events are listed in the table below.

| Badge Created Event | | |
|---|---|---|
| Fields | Caller | GUII of entity that triggered this event |
| | Badge | Label of created badge |

| | | |
|---|---|---|
| | Trusted Party | GUII of trusted entity responsible for verifying attribute values and attesting to veracity of same |

Verification Request Event example

| | | |
|---|---|---|
| Fields | Caller | GUII of entity that created this event |
| | Badge | Label of badge to be verified |

Attribute Set Event example

| | | |
|---|---|---|
| Fields | Caller | GUII of entity that created this event |
| | Badge | Label of badge in which attribute value is set |
| | Attribute Key | Label of attribute for which value is set |
| | Attribute Value | One or more cryptographic proofs of attribute value |

Attribute State Change Event example

| | | |
|---|---|---|
| Fields | Caller | GUII of entity that created this event |
| | Badge | Label of badge in which attribute attestation is changing state |
| | Attribute Key | Label of attribute attestation that is changing state |
| | Old State | State of attribute attestation before state transition |
| | New State | State of attribute attestation after state transition |

In some embodiments, attribute values may be verified by trusted entities, such as government agencies (e.g., passport authorities), employers, financial institutions, etc. A trusted entity may verify a value of an attribute, for example, by inspecting physical documents (e.g., birth certificates, driver's licenses, social security cards, pay slips, etc.) and/or interviewing a user in person. Upon successful verification, the trusted entity may cause a corresponding attribute attestation to be in a VERIFIED state. If there is any issue, the trusted entity may cause the corresponding attribute attestation to be in an INVALID state.

Figure 5:
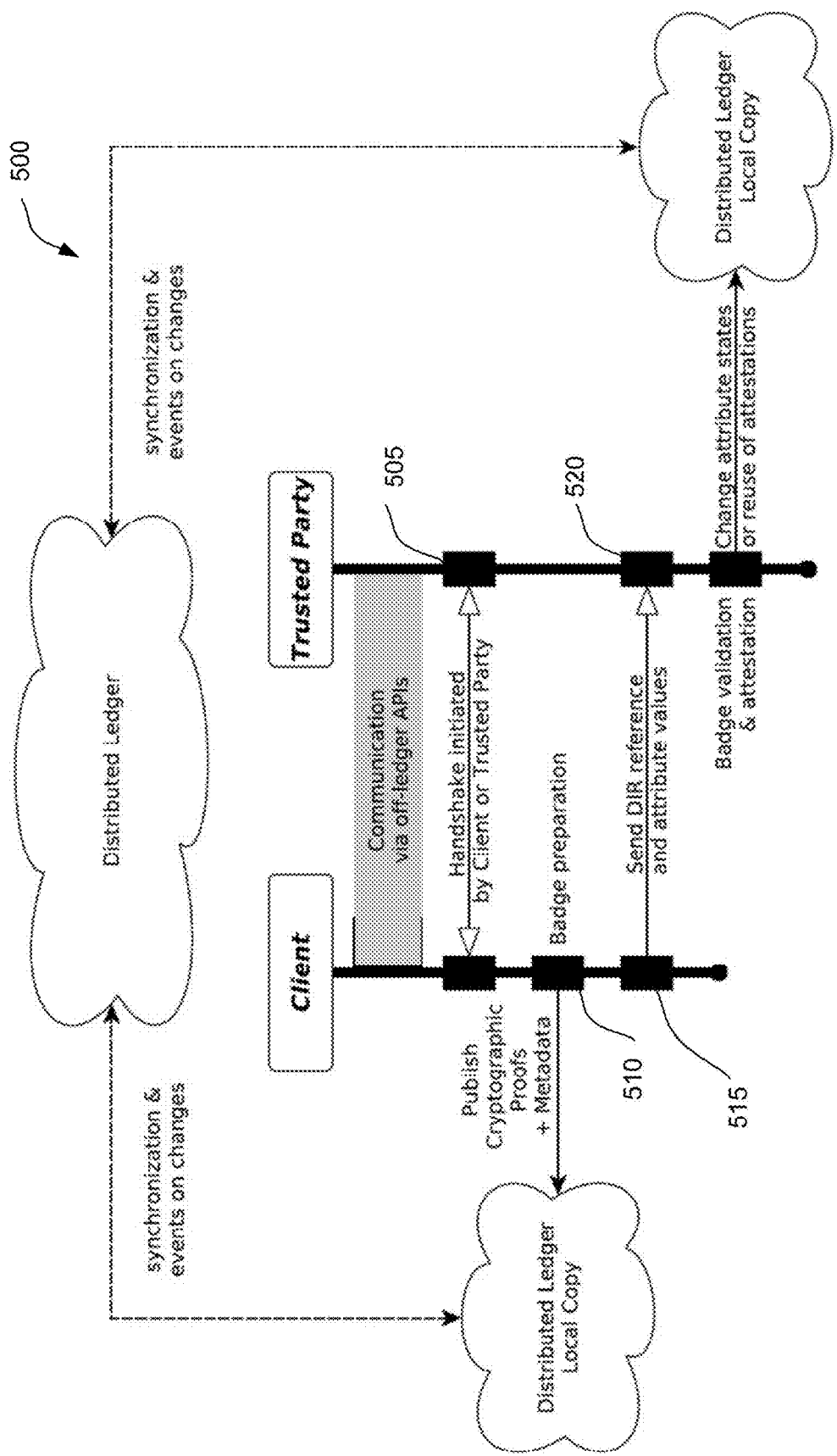
FIG. 5 shows an illustrative process 500 for attestation, in accordance with some embodiments.

FIG. 5 shows an illustrative process 500 for attestation by a trusted entity, in accordance with some embodiments. For instance, the process 500 may be performed between a user and a financial institution during a Know Your Customer (KYC) check.

In some embodiments, prior to initiating the process 500, the user may communicate with the trusted entity via one or more off-ledger interfaces in an application layer (e.g., the illustrative application layer shown in FIG. 1). For example, the user may visit the trusted entity's web site, and/or download and launch an app of the trusted entity. Such communication in the application layer may cause a PDS of the user or a PDS of the trusted entity to initiate, at act 505, a handshake in a privacy layer (e.g., the illustrative privacy layer shown in FIG. 1). Via this handshake, the PDS of the trusted entity may confirm that the trusted entity will be responsible for verifying one or more attribute values. Additionally, or alternatively, the PDS of the trusted entity may send to the PDS of the user a GUII of the trusted entity and/or a schema for creating a badge with one or more attribute attestations (e.g., those that are relevant for the KYC process).

At act 510, the user's PDS may create a badge (e.g., using a GUII of the trusted entity, and/or according to a schema provided by the PDS of the trusted entity), and may publish the badge to a distributed ledge in a trust layer (e.g., the illustrative trust layer shown in FIG. 1). The user's PDS may then, at act 515, send to the PDS of the trusted entity, via an off-ledger communication, a reference to the user's DIR along with one or more attribute values to be verified. In some embodiments, the user's DIR may trigger an on-ledger event (e.g., a "Verification Request" event) to notify the trusted entity's DIR.

At act 520, the trusted entity's DIR may use the reference received at act 515 to look up the badge from the distributed ledger. For each attribute attestation in the badge, the trusted entity's DIR may check that cryptographic proofs in the badge are generated from the received attribute values using an algorithm specified in the badge. Then the trusted entity's DIR may proceed to verify the received attribute values (e.g., either indirectly via a referenced badge, or directly by the trusted entity itself).

For instance, for a given attribute attestation, the trusted entity's DIR may check if there is a reference to another badge. If so, the trusted entity's DIR may look up the other badge from the distributed ledger, and may perform one or more checks. For instance, the trusted entity may check that an entity that verified the other badge is trustworthy, a cryptographic proof in the other badge is generated from the received attribute value using an algorithm specified in the other badge, and/or the other badge is signed by the verifying entity. Any suitable electronic signature scheme may be used, as aspects of the present disclosure are not so limited.

Additionally, or alternatively, the trusted entity may verify the received attribute value directly, for example, by inspecting physical documents and/or interviewing the user in person.

If there is no issue, the trusted entity's DIR may sign the badge and cause each attribute attestation in the badge to be in a VERIFIED state. If there are one or more problematic attribute attestations, the trusted entity's DIR may cause such an attribute attestation to be in an INVALID state.

In some embodiments, entities may form a trust structure, in which an entity may trust one or more other entities and may rely upon attribute attestations signed by any of the one or more trusted entities (e.g., as discussed above in connection with FIG. 5.) In this manner, an entity may be able to verify an attribute attestation without having to perform a physical verification.

A trust structure may include any suitable number of entities with any suitable trust relationships among the entities. Moreover, membership in a trust structure may evolve over time, as existing members leave, new members join, and/or trust relationships change.

Figure 6:
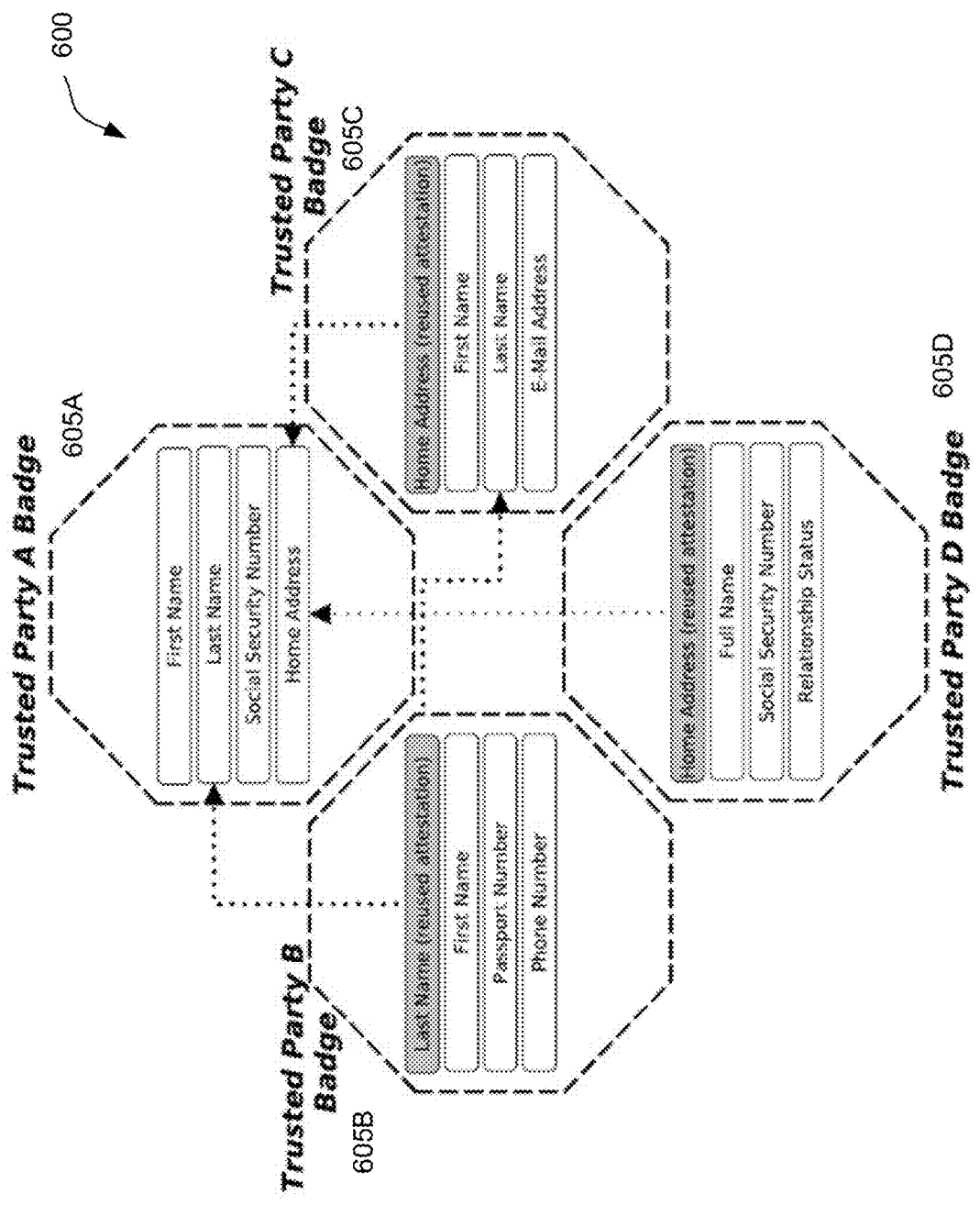
FIG. 6 shows an illustrative trust structure 600, in accordance with some embodiments.

FIG. 6 shows an illustrative trust structure 600, in accordance with some embodiments. In this example, there are four badges 605A-D in a DIR. The badges 605A-D may correspond to trusted entities A-D, respectively. The badge 605A may include the following attribute attestations: "first name", "last name," "social security number," and "home address," all of which may have been directly verified by the entity A (e.g., a bank).

In some embodiments, the badge 605C may include the following attribute attestations: "home address," "first name," "last name," and "email address." Each of these attribute attestations may have been directly verified by the entity C (e.g., an online merchant), except that the attribute attestation "home address" contains a reference to the badge 605A, indicating that the entity C trusts the entity A with respect to the "home address" attribute attestation. This may allow the entity C to see a state of the "home address" attribute attestation in the badge 605A.

In some embodiments, the badge 605D may include the following attribute attestations: "home address," "full name," "social security number," and "relationship status." Each of these attribute attestations may have been directly verified by the entity D (e.g., a social networking provider), except that the attribute attestation "home address" contains a reference to the badge 605A, indicating that the entity D trusts the entity A with respect to the "home address" attribute attestation. This may allow the entity D to see a state of the "home address" attribute attestation in the badge 605A.

In some embodiments, the badge 605B may include the following attribute attestations: "last name," "first name," "passport number," and "phone number." Each of these attribute attestations may have been directly verified by the entity B (e.g., a travel agency), except that the attribute attestation "last name" contains a reference to the badge 605A and a reference to the badge 605C, indicating that the entity B may sign the attribute attestation "last name" only if both entity A and entity C have directly, and independently, verified the attribute value for "last name." This may allow the entity B to see a state of the "last name" attribute attestation in the badge 605A and a state of the "last name" attribute attestation in the badge 605C.

Thus, in the example shown in FIG. 6, the attribute attestation "home address" may have a circle of trust including three entities, A, C, and D, where entity A has done the diligence to verify the attribute value for "last name" directly, and entities C and D rely on entity A's attestation with respect to "home address." On the other hand, the attribute attestation "last name" may have a circle of trust including three entities, A, B, and C, where entity A and C have independently done the diligence to verify the attribute value for "last name" directly, and entity Brelied upon rely on entity A's attestation with respect to "home address."

Figure 7:
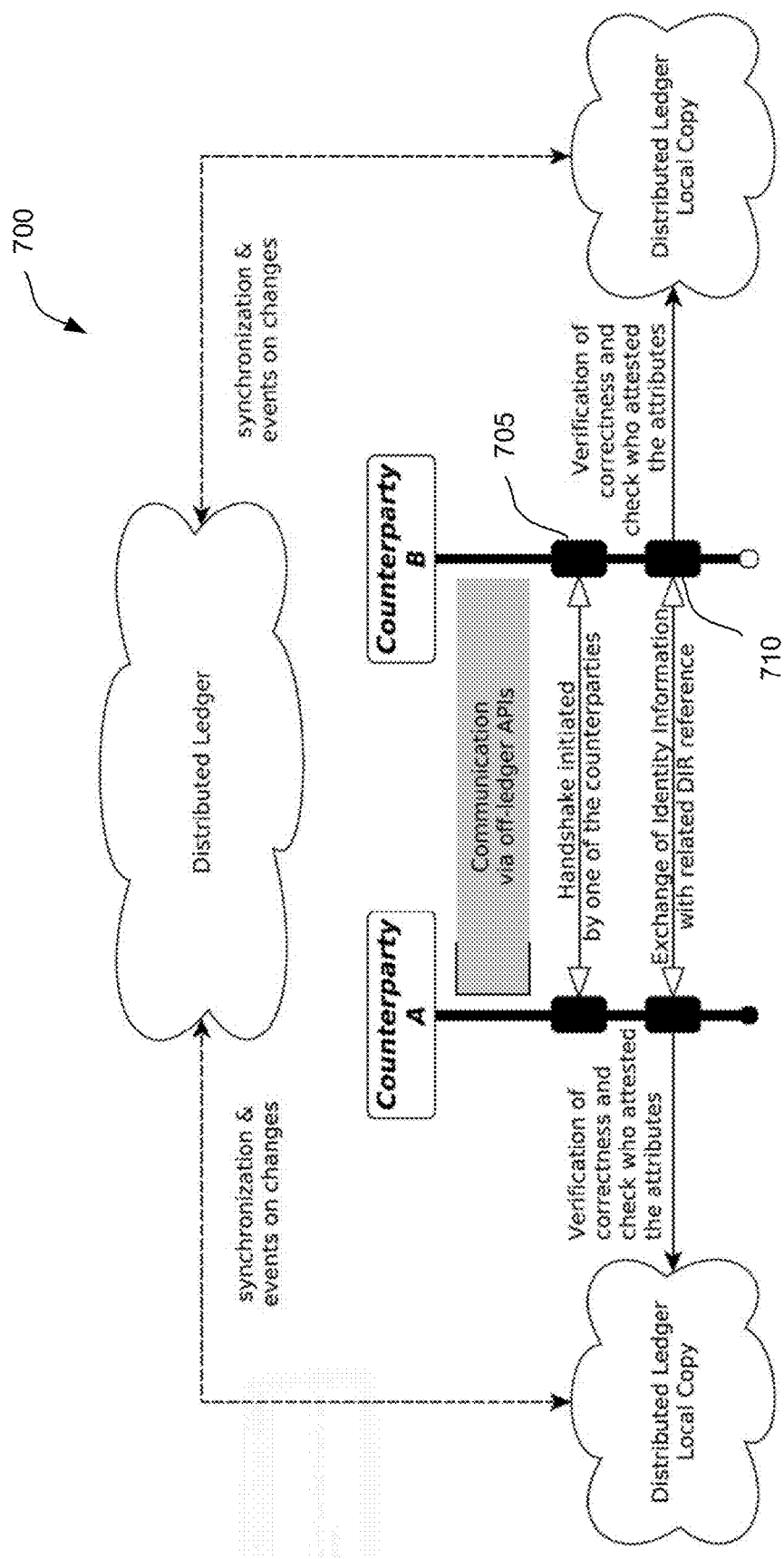
FIG. 7 shows an illustrative process 700 for counterparty checks, in accordance with some embodiments.

FIG. 7 shows an illustrative process 700 for counterparty checks, in accordance with some embodiments. In this example, a user A may interact with a user B. For instance, the user A may be a buyer in a real estate transaction, and the user B may be the seller. The process 700 may be initiated by either the user A or the user B.

In some embodiments, prior to the process 700, the users A and B may communicate via one or more off-ledger channels. For example, the users A and B may communicate indirectly (e.g., via one or more brokers), or directly (e.g., via email). As a result of such communication, the user A may instruct a PDS of the user A to initiate, at act 705, a handshake in a privacy layer (e.g., the illustrative privacy layer shown in FIG. 1) with a PDS of the user B, or vice versa.

Additionally, or alternatively, the users A and B may communicate via one or more off-ledger interfaces in an application layer (e.g., the illustrative application layer shown in FIG. 1). Such communication in the application layer may cause a PDS of the user A or a PDS of the user B to initiate, at act 705, a handshake in a privacy layer (e.g., the illustrative privacy layer shown in FIG. 1).

At act 710, the PDS of the user A and the PDS of the user B may exchange personal data (e.g., full names, home addresses, email addresses, phone numbers, etc.), and/or references to respective DIRs. If badges are used to organize attribute attestations, labels of respective badges may also be exchanged. In some embodiments, the same set of personal data may be provided from either side. However, that is not required, as the user A may request information from the user B that is not requested by the user B from the user A, and vice versa.

In some embodiments, the DIR of the user A may use the information received from the user B to look up an attribute attestation from the distributed ledger and perform one or more checks. For instance, the DIR of the user A may check that an entity that verified the attribute attestation is trustworthy, the attribute attestation is in a VERIFIED state, a cryptographic proof in the attribute attestation is generated, using an algorithm specified in a badge containing the attribute attestation, from a corresponding attribute value received from the user B, and/or the attribute attestation is signed by the verifying entity. The DIR of the user B may perform similar checks.

The inventors have recognized and appreciated it may be desirable to enhance security of an environment hosting a privacy layer component (e.g., a PDS). Additionally, or alternatively, it may be desirable to improve access control to a privacy layer and/or a trust layer.

In some embodiments, security in a hosting environment may be improved by encrypting data handled by a privacy layer component (e.g., a PDS), so that a hosting entity (e.g., a public cloud provider) may not be able to access the data as written to a physical or virtual disk. Such encryption may be done in addition to implementing the privacy layer component in a virtualized environment (e.g., one PDS per virtual machine, but multiple PDSes per physical machine) or a dedicated environment (e.g., one PDS per physical machine). However it should be appreciated that aspects of the present disclosure are not limited to such data encryption.

In some embodiments, one or more encryption keys may be stored outside of a privacy layer component (e.g., a PDS), so that a hosting entity may not have access to the one or more encryption keys. Any suitable key management scheme may be used. For example, a key may be maintained by a user of the privacy layer component.

Figure 8:
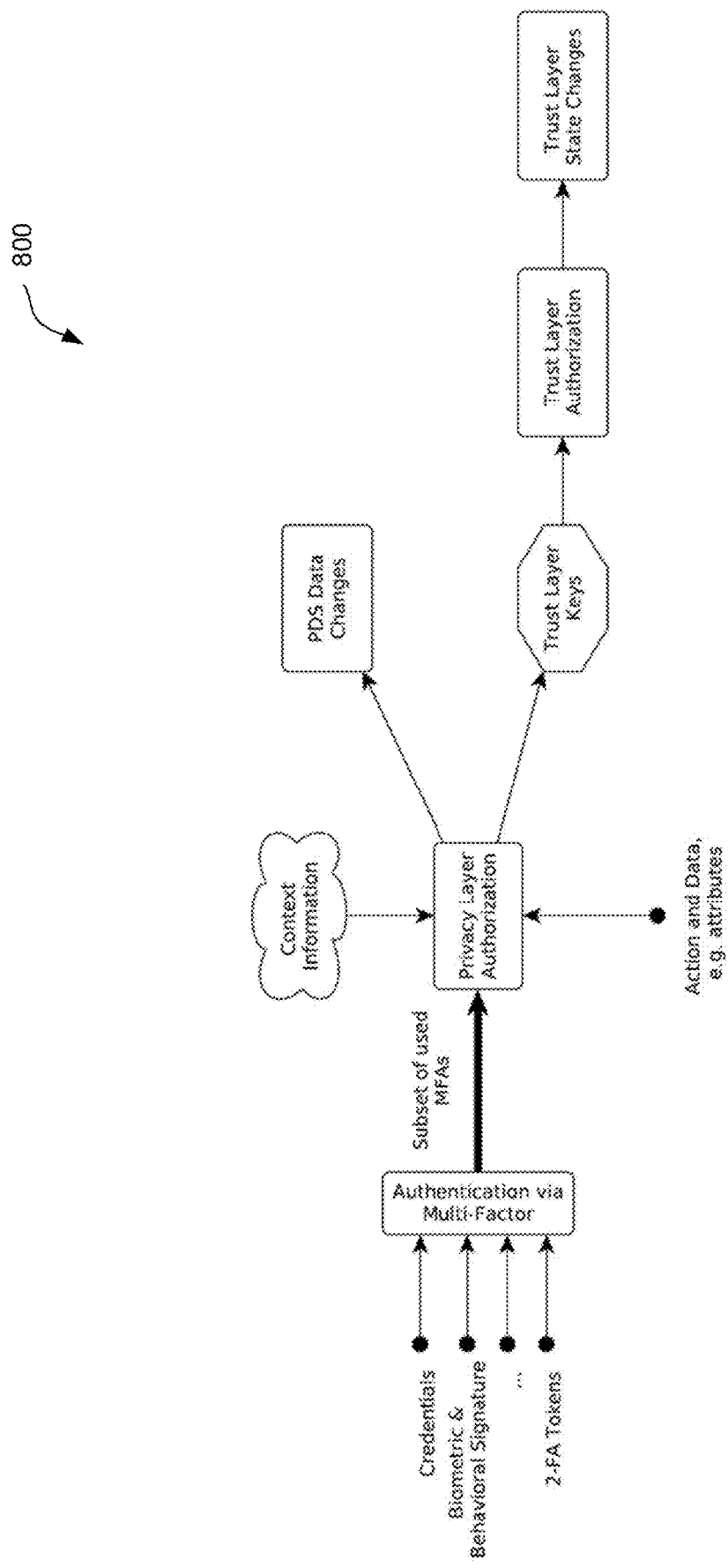
FIG. 8 shows an illustrative process 800 for a data change in a privacy layer component (e.g., a PDS) and a resulting state change in a trust layer (e.g., a DIR), in accordance with some embodiments.

In some embodiments, access control may be imposed on data changes in a privacy layer and/or state changes in a trust layer. FIG. 8 shows an illustrative process 800 for a data change in a privacy layer component (e.g., a PDS) and a resulting state change in a trust layer component (e.g., a DIR), in accordance with some embodiments.

In the example shown in FIG. 8, the process 800 is initiated by a user attempting to change an item of personal data stored in the privacy layer component, which may trigger an access control check at the privacy layer. In some embodiments, a privacy layer access control mechanism may include an authentication and/or authorization process, which may be more or less stringent depending on a type of action being requested by the user. For instance, an attempt to change critical data (e.g., passport number) may trigger a more stringent authentication process (e.g., multifactor authentication) than an attempt to change non-critical data (e.g., email address). Thus, stronger security may be provided in a granular manner, depending on sensitivity of a requested data change.

In some embodiments, successful authentication and/or authorization at the privacy layer may allow the user to complete the attempted data change at the privacy layer component. Additionally, or alternatively, the privacy layer component may, in response to successful authentication and/or authorization, retrieve one or more trust layer keys for use in accessing the trust layer. For instance, a trust layer key may be a cryptographic key to be presented to demonstrate authority to cause a trust layer component to perform one or more actions.

In some embodiments, different trust layer keys may be presented to demonstrate authority to perform different types of actions. For instance, a key associated with a higher level of authority may be presented to demonstrate authority to change critical data (e.g., passport number), compared to an attempt to change non-critical data (e.g., email address). In some embodiments, the trust layer component may be instructed to perform one or more actions (e.g., a state change) only if proper authorization has been obtained (e.g., by presenting one or more appropriate keys).

Additionally, or alternatively, one or more access rules may be provided that allow dynamic access control based on context. In this manner, access may depend on not only a nature of a requested action, but also one or more external conditions, thereby improving security. For example, stricter access rules may be enforced if there is an ongoing attack.

In some embodiments, an entity (e.g., a user or an organization) may be associated with multiple cryptographic keys. The inventors have recognized and appreciated that there may be a tradeoff between security and usability. Accordingly, in some embodiments, a system may be provided that allows an entity to choose an appropriate number of keys to achieve a desired balance between security and usability. With reference to the example shown in FIG. 3, a key management component 308 may be provided in some embodiments to keep track of multiple cryptographic public keys related to an entity controlling a DIR. Such a component may provide an abstraction from an underlying public key infrastructure (PKI). In this manner, users and/or applications in an application layer may interact only with DIRs via respective PDSes, without interacting directly with underlying cryptographic keys.

In some embodiments, the key management component 308 may perform role-based access control. For instance, there may be at least two roles, Attester and Identity Owner. The key management component 308 may allow only a trusted entity assigned to a given badge to modify a state of an attribute attestation in that badge.

As discussed above, the inventors have recognized and appreciated that it may be desirable to impose a higher degree of security to certain attributes, such as passport information. In some embodiments, this can be accomplished via one or more measures of authentication and/or authorization. For instance, one or more biometric markers may be used to increase a level of confidence in an authentication process. Additionally, or alternatively, one or more biometric markers may be used to generate a GUII, which may prevent a user from creating multiple DIRs. In some embodiments, such biometric markers may be treated as highly sensitive information and may not be shared with another entity.

Additionally, or alternatively, one or more behavioral metrics (e.g., location history, walking pattern, sleeping pattern, travel pattern, etc.) may be used to increase a level of confidence in an authentication process.

In some embodiments, sensitive attribute values (e.g., passport number) may be protected using multi-key authorization. For instance, a user may seek authorization to change such an attribute value by presenting multiple keys upon authentication. In some embodiments, each key may be associated with a different device. For instance, a user may have a first key for a laptop, a second key for a smartphone, a third key for a smartwatch, etc. An illustrative process for changing an attribute value may comprise the following steps:

1) The user may access an interface of a PDS (e.g., a web interface) and trigger a change action.

2) The change action may be recorded as a pending action, with an indication that further confirmation from the user may be needed.

3) The user may confirm the change action via at least one additional personal device. For example, the change action may be confirmed via fingerprint authentication with a registered smartphone and registered biometric signature.

In some embodiments, a user may have M keys, and at least N keys (where N<=M) may be used to perform a certain action (e.g., modifying an attribute value). In this way, a level of security may be increased so that it may be more difficult to impersonate the user. In some embodiments, M may be equal to a total number of devices registered to the user.

Additionally, or alternatively, authorization may be granted only if two or more personal devices, such as a smartwatch, a smartphone, a laptop, etc., are within some specified distance (e.g., 10 meters) from each other. Additionally, or alternatively, authorization may be granted only if a personal device is in a specified location (e.g., as determined based on GPS data). In some embodiments, if a key is compromised (e.g. if a device is stolen), the compromised key may be revoked and may be replaced with a new key. This may improve security, for example, by increasing a probability that an entity requesting an action is indeed the user corresponding to the PDS and the DIR.

The inventors have recognized and appreciated that, when multiple keys are used, a compromised authentication key may be revoked and replaced, while preserving the user's ability to access the PDS and the DIR in the interim. In some embodiments, one or more keys, along with one or more access rights, may be propagated through the distributed ledge, so that the one or more keys and one or more access rights may become tamper resistant and verifiable by any entity. As discussed above, privacy protection may be achieved, in some embodiments, by using cryptographic one-way functions to derive proofs of sensitive data. It may be computationally challenging to derive the original sensitive data from the proofs. By including only non-sensitive proofs in the shared distributed ledger, a high degree of privacy can be achieved. Secure off-ledger communication channels between entities may be used to share the original sensitive information. Additionally, or alternatively, a schema may be used to provide a granular structure of attributes, which may further improve privacy. For instance, instead of sharing unnecessary information (e.g., home address or actual birth date), only information that is relevant for a particular context (e.g., over 21 years of age for purposes of purchasing an alcoholic beverage) may be shared with another entity. To further improve privacy, an entity may, in some embodiments, be identified using different identifiers in different badges. In this manner, it may be more difficult for an attacker to trace the interactions back to the entity.

Since Bitcoin's introduction in 2009, different blockchains and other distributed ledgers have emerged. The inventors have recognized and appreciated that it may be beneficial to provide a unified and standardized way to connect different blockchains and/or other distributed ledgers, which may be different instances of a same distributed ledger design, or may be of different distributed ledger designs. Accordingly, in some embodiments, a unified protocol stack may be provided to link such independently implemented distributed ledgers, thereby avoiding data and network silos.

In some embodiments, different distributed ledgers may be linked via references. For instance, cross-ledger references may be used to link individual identities to external ledgers. Additionally, or alternatively, references may be used to connect identities across different ledgers. An illustrative cross-ledger reference scheme is shown below.

```
Cross-Ledger Reference URI scheme
URI    ::= 'blockchain:' <magicNo> <trx>
<trx>  ::= '?trx=' <trxId> [ "#" <field> ]
<field> ::= ... (one or more transaction field labels)
```

In some embodiments, different transaction field labels may be provided in a cross-ledger reference URI. For instance, a set of standardized labels may be used to facilitate cross-ledger communications. However, it should be appreciated that aspects of the present disclosure are not limited to the use of standardized transaction field labels, or any transaction field label at all.

The inventors have recognized and appreciated that a cross-ledger reference scheme such as the above illustrative Uniform Resource Identifier (URI)) scheme may provide an abstraction layer above an underlying transport protocol. For instance, a customized discovery mechanism may be provided for finding nodes that are managing a distributed ledger with a certain identifier (e.g., magicNo X). Additionally, or alternatively, one or more HTTP requests and/or DNS resolution to multiple nodes may be used. The illustrative URI scheme shown above may describe a set of properties to be satisfied to allow discoverability of distributed ledgers in an Internet-scale network.

In some circumstances, nodes may join and/or leave a distributed ledger. Accordingly, in some embodiments, a discovery mechanism may return to a requesting entity a list of nodes that is up-to-date. This may reduce communication overhead between nodes (e.g., by avoiding handshake requests sent to nodes that are no longer managing a distributed ledger).

In some embodiments, more than one distributed ledger (e.g., more than one blockchains) may be used. In such an architecture, a discovery mechanism may be provided to find nodes throughout the multiple distributed ledgers. Compared to a single distributed ledger architecture, communication overhead in a multiple distributed ledger architecture may be small, and may comprise only one request that specifies a distributed ledger identifier (e.g., magicNo X). A response may comprise a list of nodes that currently manage the requested distributed ledger. In some embodiments, an underlying data structure may be a distributed hash table (DHT). Each time a node starts to manage a distributed ledger, it may announce its action to the network. Nodes may also announce when they stop managing a distributed ledger.

Figure 9:
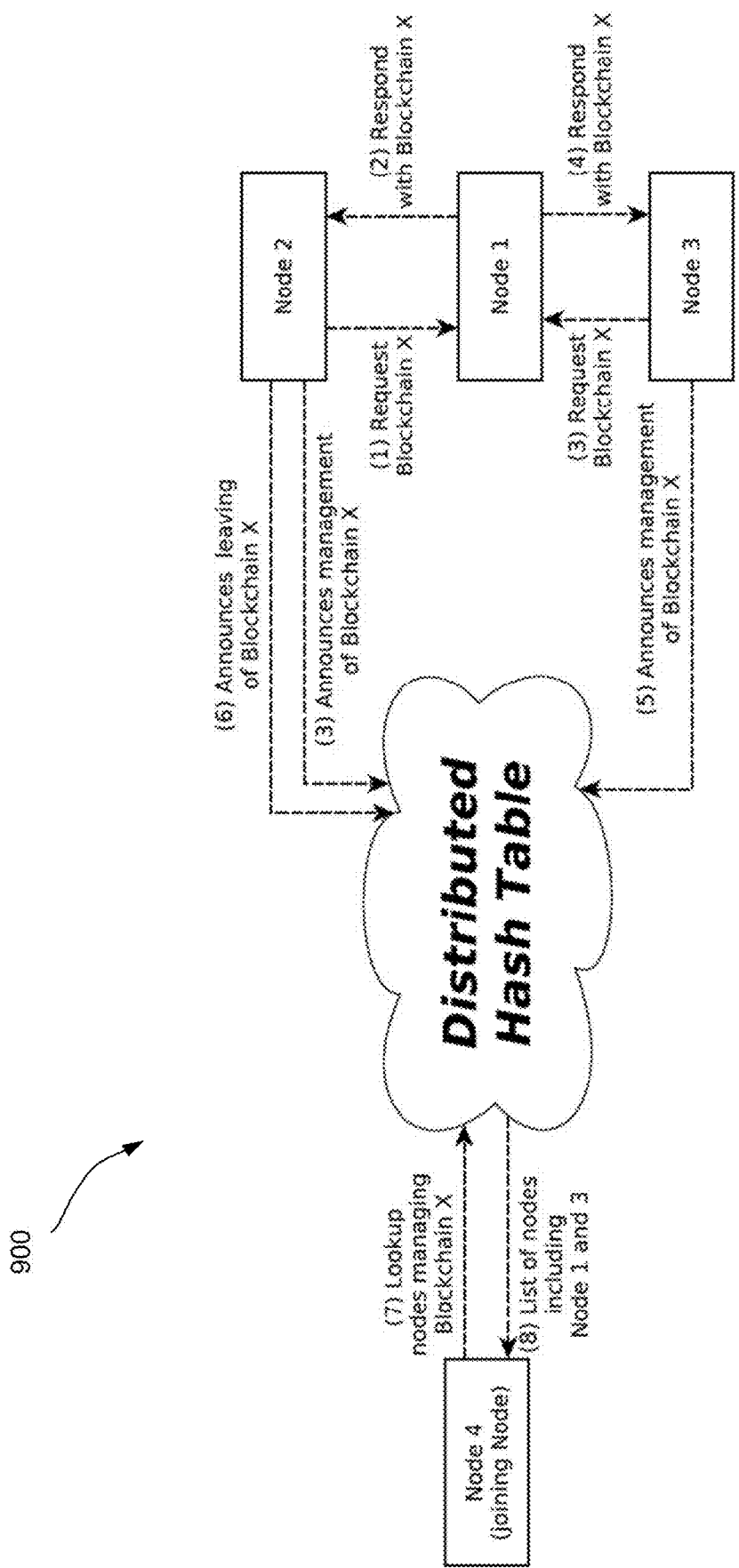
FIG. 9 shows an illustrative distributed ledger discovery mechanism in a network 900, in accordance with some embodiments.

FIG. 9 illustrates an example of a distributed ledger discovery mechanism in a network 900, in accordance with some embodiments. At act 1, node 2 may request access to blockchain X from node 1. In response, node 1 may grant permission to node 2 at act 2. At act 3, node 2 may announce to blockchain X that it now manages blockchain X. At act 3, node 3 may also request access to blockchain X to node 1. In response, node 1 may grant permission to node 3 at act 4. At act 5, node 3 may announce to blockchain X that it now manages blockchain X. At act 6, node 2 may decide to leave blockchain X, and may announce its departure to blockchain X. At act 7, node 4 may look up which nodes are managing blockchain X. The blockchain may return an updated list of managing nodes at act 8.

Figure 11:
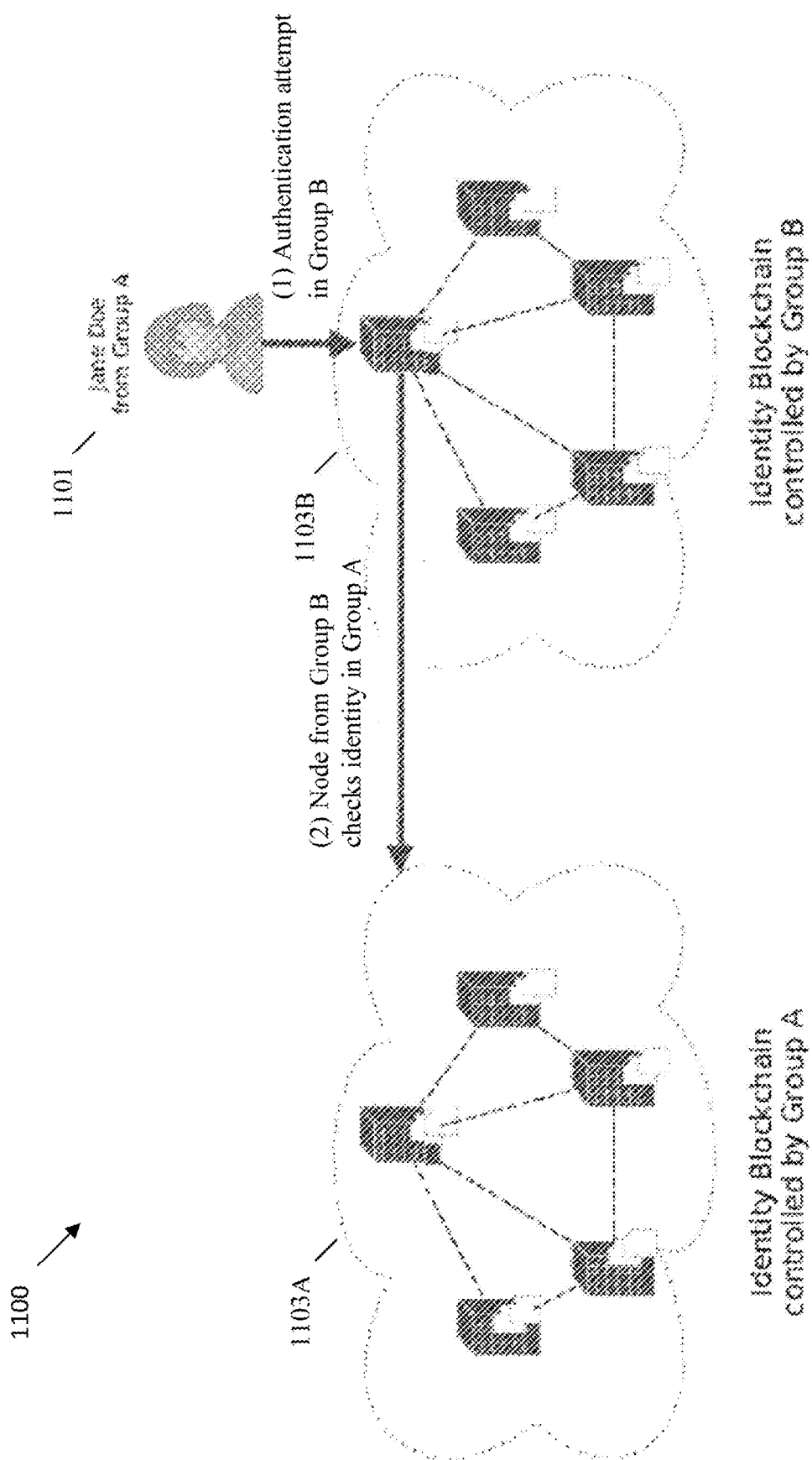
FIG. 11 shows an illustrative process 1100 for checking identity across different distributed ledgers, in accordance with some embodiments.

FIG. 11 shows an illustrative process 1100 for checking identity across different distributed ledgers, in accordance with some embodiments. For instance, the process 1100 may be performed by a node managing a first distributed ledger (e.g., distributed ledger 1103B) for a first group of one or more entities (e.g., group B) in response to an authentication request from a user 1101 (e.g., Jane Doe) who has an identity in a second distributed ledger (e.g., distributed ledger 1103A) of a second group of one or more entities (e.g., group A). Such entities may include individuals and/or organizations (e.g., government agencies, healthcare institutions, financial institutions, retailers, social networking service providers, employers, etc.)

In some embodiments, a node managing the distributed ledger 1103B may receive a key credential from the user 1101. The key credential may be associated with the distributed ledger 1103A, and may include a proof of a statement about the user 1101 (e.g., "is older than 21" or "is allowed to drive a car"). For instance, the node may be operated by a bar, the user 1101 may be attempting to purchase an alcoholic beverage. The user 1101 may send the key credential for the statement, "is older than 21," and may request that the node check the key credential.

In some embodiments, the node managing the distributed ledger 1103B may identify, from the user 1101's request, a reference to the distributed ledger 1103A (e.g., a reference based on the illustrative URI scheme described above), and may use a discovery mechanism (e.g., the illustrative discovery mechanism shown in FIG. 9 and described above) to find a node managing the distributed ledger 1103A. For instance, the reference may include an identifier of the distributed ledger 1103A (e.g., magicNo X), and a lookup may be performed in a distributed hash table for that identifier. The hash table may be managed by a network of nodes that also manage the distributed ledger 1103A, or a different network of nodes.

In some embodiments, the node managing the distributed ledger 1103B may communicate with the node managing the distributed ledger 1103A to check the statement about the user 1101. For instance, the reference to the distributed ledger 1103A may include an identifier for a transaction recorded on the distributed ledger 1103A. The transaction may be recorded to indicate that an identity service provider has verified and/or signed the statement about the user. The node managing the distributed ledger A may check the transaction to confirm that the statement about the user was indeed signed by the identity service provider.

In some embodiments, the node managing the distributed ledger 1103B may determine whether the identity service provider that verified the statement about the user 1101 should be trusted. For instance, the node managing the distributed ledger 1103B may check a public key of the identity service provider against one or more trusted databases (e.g., a blacklist and/or a whitelist). Internal and/or public databases may be consulted.

In some embodiments, the node managing the distributed ledger 1103B may accept the statement about the user 1101 only if: the statement was signed by the identity service provider, and the identity service provider is to be trusted. Additionally, or alternatively, the node managing the distributed ledger 1103B may accept the statement about the user 1101 only if the distributed ledger 1103A is to be trusted.

Any one or more of the techniques described herein may be used in various settings to simplify verification of personal data. For instance, in some embodiments, a customized badge schema may be provided for each use case, including all attributes relevant for that use case. In this manner, a badge generated based on the schema may include all relevant data, and a PDS managing the badge may keep the data up-to-date.

Non-limiting examples of uses cases are described below.

I. Know You Customer (KYC)

One of such applications is Know Your Customer (KYC) checks, which may be performed by financial institutions, such as banks. The identity of a user (e.g., a customer of a bank) may be validated through a process in which a trusted entity (e.g., the bank) verifies one or more attribute values submitted by the user. This process may be performed using one or more of the techniques described herein. Once the one or more attribute values have been verified, the trusted entity may sign one or more corresponding attribute attestations, and such an attestation may be subsequently relied upon by another trusted entity, so long as the former trusted entity and the latter trusted entity are part of a trust structure.

Financial institutions may have to follow strict rules and regulations to verify who their customers are. On the one hand, financial institutions may be required to maintain records of their customers. On the other hand, financial institutions may be required to keep such data private and secure. By allowing users (e.g., bank customers) to control their own data and by providing the users with a platform to manage and share their data, the resulting KYC checks may be significantly more efficient and data duplicates may be limited. From the perspective of a user, data may be entered at the time a PDS is created, and subsequently only when an attribute is changed. In this way, the burden of entering the same information multiple times may be eliminated. From the perspective of a financial institute, the accuracy of data may be significantly increased because, for example, updates may be automatically propagated to all relevant trusted entities.

II. Employee Attestation

Compared to KYC checks, attestation of employees is less regulated. Nevertheless, employers may use any one or more of the techniques described herein to attest identity and/or other information of their employees. Such attestations may be used internally for authentication and/or authorization purposes, and/or externally for securely sharing information with partners and/or other stakeholders. In this way, assurance with respect to a purported identity may be guaranteed. In some embodiments, a process of granting employees authorization to perform certain tasks on behalf of the employer may be significantly simplified. Because attributed may be propagated to all trusted stakeholders, a desired level of authorization is up-to-date at all times.

III. Security Checks

Any one or more of the techniques described herein may be used to allow acceleration of security checks (e.g., security checks performed at airports, security checks for granting access to restricted areas or buildings, etc.). For instance, instead of having to manually check identity documents (IDs) or other identifying information, a security check may be automated.

In some embodiments, an automated security check may include real time retrieval of an up-to-date criminal record (e.g., updated within the last six months), which may have been attested to by an appropriate trusted entity.

IV. Transportation Security Administration (TSA)

In one example, a traveler may have a PDS and a related DIR including a set of attribute attestations. The DIR may include a schema that is suitable for TSA checks. In this way, airport security checks may be performed by a TSA agent by performing a counterparty check. An example of one such counterparty check may comprise the following steps:

1) a traveler may approach a TSA security checkpoint at the airport;

2) the traveler's mobile device may share attribute values with a TSA system;

3) the TSA system may confirm reception of the shared attribute values;

4) a TSA agent opens the shared attribute values and visually compares the values with the traveler. Additionally, or alternatively, the traveler may scan a fingerprint and/or other biometric features. Such features may be compared with corresponding features included in the shared attribute values.

5) the TSA system may: check whether the received attribute values are legitimate by checking the values against the distributed ledger while making sure that the signing trusted entity is trusted by the TSA; cross-check one or more attribute values against external lists (e.g. no-flying or terror watch lists); and/or perform facial recognition or cross-check received photo identification against a real time video stream.

If all of the above checks pass, the traveler may be marked as trusted. Accordingly, the TSA may no longer need to maintain large databases. In addition, this approach may combine physical passport check and all background checks in one simple step. In this way, background checks may easily be performed at each encounter.

V. Check-Ins

Check-ins often require a customer to wait in line. Such waits may be significantly shortened by using one or more of the techniques described herein. For instance, a customer may have a PDS and related DIR, and identity and/or other relevant data may be attested by an attesting organization (e.g., hotel, car rental, etc.) by checking references of attributes. During a booking phase, a customer may use a PDS to share relevant information with the organization. Instead of manually filling in personal information, the organization's system may notify the customer what attribute values are required. During a check-in phase, the customer may directly take control of a hotel room, vehicle, etc. without having to see an agent or provide personal information. In some embodiments, the customer may unlock the hotel room or vehicle by proving that he/she has access to the Digital Identity Representation used during the booking phase. For instance, the customer may use a mobile device that is enabled to control the PDS.

VI. Age-Restricted Venues

Certain venues, such as bars, may require their customers to provide proofs that they are older than a certain age. To provide a proof of age, a customer may create a badge to share relevant information with a venue. The badge may be formed using a specific schema, which may only comprise the customer's age, or the customer's age and name. Sharing of information may be performed using a mobile device. If the age has been attested by another trusted party, the venue may conclude that the age information provided by the customer is in fact true.

In some embodiments, advantageous technical effects are provided via decentralized and protective storage locations whereby sensitive and (highly) vulnerable user information may be stored in an protected manner by applying a cryptographic one-way function. Furthermore, a redundancy of verification procedures for determining veracity of (user) information may be easily reduced by sharing state information (e.g. whether an attribute value is verified) on respective request among independent entities which trust each other. Not only time but also other resources may be saved thereby, for example, by avoiding unnecessary workflows (and hence reduce network traffic), duplicates of personal data sets (and hence computer storage), and highly expensive infrastructures for providing centralized storage and administration systems, such as a central clearing house, to keep comparable databases available at all times under all conceivable circumstances. Thus, an increased efficiency of data administration may also cause, for example, a reduction of infrastructure and necessary computing power, and/or a reduction in response time.

In some embodiments, by sharing (user) information in a protected manner, for example, by using advantageous hashing algorithms, even sensitive (user) information may be kept at an accessible location without endangering thievery, inadmissible or fraudulent modification, and the like by foreign, untrusted entities within a network environment of multiple different entities, which may trust each other.

Some illustrative aspects of the present disclosure are described below. Thereby, a personal identity representation of at least one of the plurality of entities may be considered as the Digital Identity Representation (DIR) and a user data structure of at least one of the plurality of entities may be considered as the Personal Data Service (PDS).

1. A computer-implemented method comprising acts of:
using a plurality of measurements taken from a user to generate an identifier for the user, the identifier comprising a cryptographic proof of the plurality of measurements;
instantiating a digital identity representation associated with the identifier for the user, the digital identity representation comprising program code that implements rules for attestation;
generating an electronic signature over the digital identity representation; and
publishing the digital identity representation and the electronic signature to a distributed ledger system.

2. The computer-implemented method of aspect 1, wherein the plurality of measurements comprise at least one biometric measurement and at least one behavioral measurement.

3. The computer-implemented method of claim 1, further comprising an act of:
receiving a confirmation from the distributed ledger system that a record of the digital identity representation has been created.

4. The computer-implemented method of aspect 3, wherein the distributed ledger system is implemented using at least one blockchain.

5. The computer-implemented method of aspect 1, further comprising acts of:
sending, via the distributed ledger system, a request to a trusted entity to verify a badge, the badge comprising a plurality of cryptographic proofs corresponding respectively to a plurality of attributes, wherein each cryptographic proof is generated based on a value of the attribute corresponding to the cryptographic proof; and
sending, via a channel outside the distributed ledger system, to the trusted entity, the plurality of values of the plurality of attributes.

6. The computer-implemented method of aspect 1, further comprising acts of:
receiving a pointer to a badge;
using the pointer to access the badge from the distributed ledger system, the badge comprising, the badge comprising a plurality of attribute attestations corresponding respectively to the plurality of attributes, wherein for each attribute, the corresponding attribute attestation comprises a cryptographic proof;
receiving, via a channel outside the distributed ledger system, a plurality of values corresponding respectively to the plurality of attributes;
identifying, from the badge, an entity that is responsible for verifying the badge;
determining whether to trust the entity responsible for verifying the badge; and in response to determining that the entity responsible for verifying the badge is to be trusted, checking, for each attribute attestation of the plurality of attribute attestations, whether:
the attribute attestation is a in VERIFIED state;
the cryptographic proof in the attribute attestation is a valid proof of the received value corresponding to the attribute; and the attribute attestation is electronically signed by the entity responsible for verifying the badge.

7. A computer-implemented method comprising acts of:
selecting a schema from a plurality of schemas for badges, the schema comprising a plurality of attributes;
generating, according to the schema, a badge for use in attesting to an identity of a user, wherein the act of generating comprises:
identifying a plurality of values, each value corresponding to an attribute of the plurality of attributes in the schema;
generating at least one cryptographic proof for each value of the plurality of values; and
identifying a trusted entity for verifying the plurality of values; and
publishing the badge to a distributed ledger system.

8. The computer-implemented method of aspect 7, wherein the distributed ledger system comprises a digital identity representation associated with an identifier for the user, the digital identity representation comprises program code that implements rules for attestation.

9. The computer-implemented method of aspect 8, wherein:
for each attribute of the plurality of attributes, the badge comprises an attribute attestation for that attribute, wherein the attribute attestation comprises at least one cryptographic proof for a corresponding attribute value; and
the program code, when executed by at least one processor, maintains state information for the attribute attestation of each attribute of the plurality of attributes.

10. The computer-implemented method of aspect 9, wherein at least one attribute attestation is in a state selected from a group consisting of: PENDING, VERIFIED, EXPIRED, and INVALID.

11. The computer-implemented method of aspect 10, wherein the program code, when executed by the at least one processor, causes the at least one attribute attestation to transition from a PENDING state to a VERIFIED state only in response to a notification from the trusted entity that a corresponding attribute value has been verified by the trusted entity.

12. The computer-implemented method of aspect 10, wherein the program code, when executed by the at least one processor, causes the at least one attribute attestation to transition from a VERIFIED state to an EXPIRED state upon expiration of a timer that was set when a corresponding attribute value was last verified.

13. The computer-implemented method of aspect 10, wherein the program code, when executed by the at least one processor, allows access to a cryptographic proof for a corresponding attribute value only if the at least one attribute attestation is in a VERIFIED state.

14. A computer-implemented method comprising:
receiving, via a distributed ledger system, a request to verify a badge, the badge comprising a plurality of attribute attestations corresponding respectively to a plurality of attributes for a user, wherein for each attribute, the corresponding attribute attestation comprises a cryptographic proof;

receiving, via a channel outside the distributed ledger system, a plurality of values corresponding respectively to the plurality of attributes;

for at least one attribute of the plurality of attributes:

verifying whether the value corresponding to the at least one attribute is a correct value of the at least one attribute for the user;

in response to verifying that the value corresponding to the at least one attribute is a correct value of the at least one attribute for the user, causing, via the distributed ledger system, the attribute attestation corresponding to the at least one attribute to be in a VERIFIED state.

15. A computer-implemented method comprising:

receiving, via a distributed ledger system, a request to verify a first badge, the first badge comprising a plurality of attribute attestations corresponding respectively to a plurality of attributes for a user, wherein for each attribute, the corresponding attribute attestation comprises a cryptographic proof;

receiving, via a channel outside the distributed ledger system, a plurality of values corresponding respectively to the plurality of attributes;

for at least one attribute of the plurality of attributes:

identifying, from the first badge, a first attribute attestation corresponding to the at least one attribute, the first attribute attestation comprising a first cryptographic proof;

identifying, from the first attribute attestation, a pointer to a second badge;

using the pointer to access the second badge from the distributed ledger;

identifying, from the second badge, an entity that is responsible for verifying the second badge, and a second attribute attestation corresponding to the at least one attribute;

determining whether to trust the entity responsible for verifying the second badge; and in response to determining that the entity responsible for verifying the second badge is to be trusted, checking whether:

(1) the second attribute attestation is in a VERIFIED state;

(2) the second cryptographic proof is a valid proof of the received value corresponding to the at least one attribute; and (3) the second attribute attestation is electronically signed by the entity responsible for verifying the second badge.

16. The method of aspect 15, further comprising an act of checking whether:

(4) the first cryptographic proof is a valid proof of the received value corresponding to the at least one attribute;

17. The method of aspect 16, further comprising acts of, in response to checking that (1)-(4) are satisfied:

electronically signing the first attribute attestation; and causing the first attribute attestation to transition to a VERIFIED state.

Figure 10:
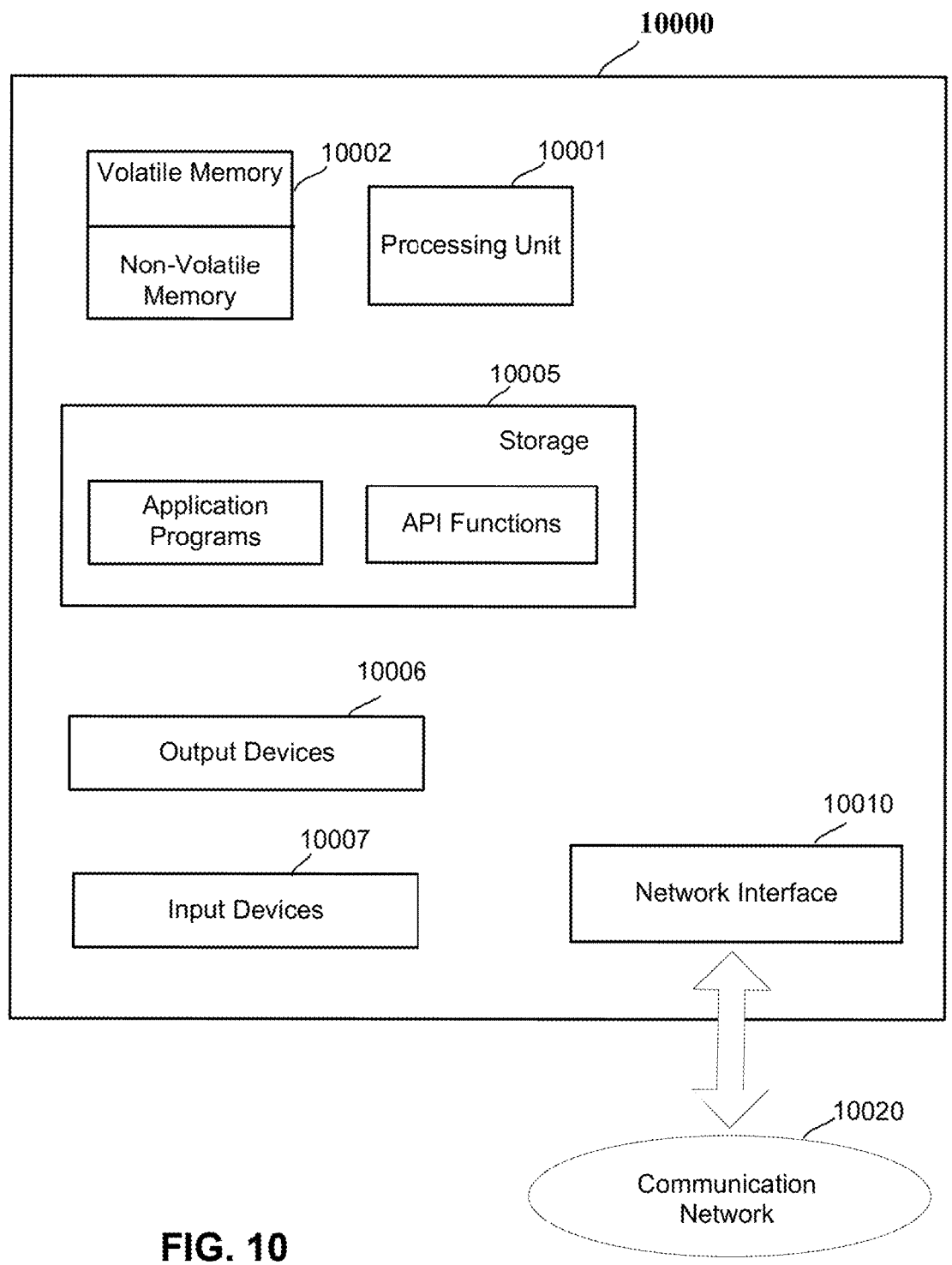
FIG. 10 shows, schematically, an illustrative computer 10000 on which any aspect of the present disclosure may be implemented.

FIG. 10 shows, schematically, an illustrative computer 10000 on which any aspect of the present disclosure may be implemented. In the embodiment shown in FIG. 10, the computer 10000 includes a processing unit 10001 having one or more processors and a non-transitory computer-readable storage medium 10002 that may include, for example, volatile and/or non-volatile memory. The memory 10002 may store one or more instructions to program the processing unit 10001 to perform any of the functions described herein. The computer 10000 may also include other types of non-transitory computer-readable medium, such as storage 10005 (e.g., one or more disk drives) in addition to the system memory 10002. The storage 10005 may also store one or more application programs and/or external components used by application programs (e.g., software libraries), which may be loaded into the memory 10002.

The computer 10000 may have one or more input devices and/or output devices, such as devices 10006 and 10007 illustrated in FIG. 10. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards and pointing devices, such as mice, touch pads, and digitizing tablets. As another example, the input devices 10007 may include a microphone for capturing audio signals, and the output devices 10006 may include a display screen for visually rendering, and/or a speaker for audibly rendering, recognized text.

As shown in FIG. 10, the computer 10000 may also comprise one or more network interfaces (e.g., the network interface 10010) to enable communication via various networks (e.g., the network 10020). Examples of networks include a local area network or a wide area network, such as an enterprise network or the Internet. Such networks may be based on any suitable technology and may operate according to any suitable protocol and may include wireless networks, wired networks or fiber optic networks. Having thus described several aspects of at least one embodiment, it is to be appreciated that various alterations, modifications, and improvements will readily occur to those skilled in the art. Such alterations, modifications, and improvements are intended to be within the spirit and scope of the present disclosure. Accordingly, the foregoing description and drawings are by way of example only.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the concepts disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the present disclosure discussed above. The computer-readable medium or media can be transportable, such that the program or programs stored thereon can be loaded onto one or more different computers or other processors to implement various aspects of the present disclosure as discussed above.

The terms "program" or "software" are used herein to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various features and aspects of the present disclosure may be used alone, in any combination of two or more, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the concepts disclosed herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A computer-implemented method comprising acts of:
    receiving a request to validate at least one statement about a user;
    identifying, from the request, a reference to a distributed ledger, the reference comprising an identifier for the distributed ledger and an identifier for a transaction recorded on the distributed ledger;
    identifying, based at least in part on the identifier for the distributed ledger, at least one node of a network of nodes managing the distributed ledger;
    identifying an identity service provider that verified the at least one statement about the user;
    determining whether the identity service provider is to be trusted; and
    communicating with the at least one node to validate the at least one statement about the user only if:
        the identity service provider is to be trusted; and
        the at least one statement about the user is electronically signed by the identity service provider.

2. The method of claim 1, wherein the act of identifying the at least one node comprises performing a lookup in a distributed hash table for the identifier for the distributed ledger.

3. The method of claim 2, wherein the distributed hash table is managed by the network of nodes managing the distributed ledger.

4. The method of claim 1, wherein the reference to the distributed ledger further comprises an identifier for a field in the transaction recorded on the distributed ledger.

5. The method of claim 1, wherein the reference comprises a Uniform Resource Identifier (URI).

6. The method of claim 1, further comprising acts of:
    determining whether the distributed ledger is to be trusted; and
    validating the at least one statement about the user only if the distributed ledger is to be trusted.

7. The method of claim 1, wherein the distributed ledger comprises a first distributed ledger, the at least one node comprises at least one first node, and the network of nodes comprises a first network of nodes, and wherein:
    the acts of receiving the request, identifying the reference, identifying the at least one node, and communicating with the at least one node are performed by at least one second node of a second network managing a second distributed ledger different from the first distributed ledger.

8. A system comprising:
    at least one computer processor;
    at least one non-transitory computer-readable medium having encoded thereon instructions which, when executed, cause the at least one computer processor to:
        receive a request to validate at least one statement about a user;
        identify, from the request, a reference to a distributed ledger, the reference comprising an identifier for the distributed ledger and an identifier for a transaction recorded on the distributed ledger;
        identify, based at least in part on the identifier for the distributed ledger, at least one node of a network of nodes managing the distributed ledger;
        identify an identity service provider that verified the at least one statement about the user;
        determine whether the identity service provider is to be trusted; and
        communicate with the at least one node to validate the at least one statement about the user only if:
            the identity service provider is to be trusted; and
            the at least one statement about the user is electronically signed by the identity service provider.

9. The system of claim 8, wherein the at least one computer processor is programmed to identify the at least one node at least in part by performing a lookup in a distributed hash table for the identifier for the distributed ledger.

10. The system of claim 9, wherein the distributed hash table is managed by the network of nodes managing the distributed ledger.

11. The system of claim 8, wherein the reference to the distributed ledger further comprises an identifier for a field in the transaction recorded on the distributed ledger.

12. The system of claim 8, wherein the reference comprises a Uniform Resource Identifier (URI).

13. The system of claim 8, wherein the at least one computer processor is further programmed to:
    determine whether the distributed ledger is to be trusted; and
    validate the at least one statement about the user only if the distributed ledger is to be trusted.

14. The system of claim 8, wherein the distributed ledger comprises a first distributed ledger, the at least one node comprises at least one first node, and the network of nodes comprises a first network of nodes, and wherein:
    the at least one computer processor is on at least one second node of a second network managing a second distributed ledger different from the first distributed ledger.

15. At least one non-transitory computer-readable medium having encoded thereon instructions which, when executed, cause at least one computer processor to perform acts of:
    receiving a request to validate at least one statement about a user;
    identifying, from the request, a reference to a distributed ledger, the reference comprising an identifier for the distributed ledger and an identifier for a transaction recorded on the distributed ledger;
    identifying, based at least in part on the identifier for the distributed ledger, at least one node of a network of nodes managing the distributed ledger;
    identifying an identity service provider that verified the at least one statement about the user;
    determining whether the identity service provider is to be trusted; and
    communicating with the at least one node to validate the at least one statement about the user only if:
        the identity service provider is to be trusted; and
        the at least one statement about the user is electronically signed by the identity service provider.

16. The at least one computer-readable medium of claim 15, wherein the act of identifying the at least one node comprises performing a lookup in a distributed hash table for the identifier for the distributed ledger.

17. The at least one computer-readable medium of claim 16, wherein the distributed hash table is managed by the network of nodes managing the distributed ledger.

18. The at least one computer-readable medium of claim 15, wherein the reference to the distributed ledger further comprises an identifier for a field in the transaction recorded on the distributed ledger.

19. The at least one computer-readable medium of claim 15, wherein the reference comprises a Uniform Resource Identifier (URI).

20. The at least one computer-readable medium of claim 15, wherein the method further comprises acts of:
    determining whether the distributed ledger is to be trusted; and
    validating the at least one statement about the user only if the distributed ledger is to be trusted.

21. The at least one computer-readable medium of claim 15, wherein the distributed ledge comprises a first distributed ledger, the at least one node comprises at least one first node, and the network of nodes comprises a first network of nodes, and wherein:
    the acts of receiving the request, identifying the reference, identifying the at least one node, and communicating with the at least one node are performed by at least one second node of a second network managing a second distributed ledger different from the first distributed ledger.

* * * * *